US010824771B2

(12) United States Patent
Achillopoulos

(10) Patent No.: US 10,824,771 B2
(45) Date of Patent: Nov. 3, 2020

(54) ROBOT FOR DATA LOGGING PERTAINING TO TAMPERING PROTECTION AND PHYSICAL HANDLING OF PORTABLE SERVER SERIOUSLY MASSIVE STORAGE SYSTEM

(71) Applicant: Evangelos Achillopoulos, Alimos (GR)

(72) Inventor: Evangelos Achillopoulos, Alimos (GR)

(73) Assignee: AEROMOVE EUROPE S.M. P.C., Athens (GR)

( * ) Notice: Subject to any disclaimer, the term of this patent is extended or adjusted under 35 U.S.C. 154(b) by 351 days.

(21) Appl. No.: 15/987,225

(22) Filed: May 23, 2018

(65) Prior Publication Data

US 2019/0362080 A1    Nov. 28, 2019

(51) Int. Cl.
| | | |
|---|---|---|
| G06F 21/86 | (2013.01) | |
| G06F 11/30 | (2006.01) | |
| G06F 11/34 | (2006.01) | |
| H04L 29/06 | (2006.01) | |
| G06F 21/72 | (2013.01) | |
| H04W 4/38 | (2018.01) | |
| G06F 21/60 | (2013.01) | |

(Continued)

(52) U.S. Cl.
CPC .......... *G06F 21/86* (2013.01); *G06F 11/3006* (2013.01); *G06F 11/3476* (2013.01); *G06F 21/72* (2013.01); *H04L 63/0428* (2013.01); *H04W 4/38* (2018.02); *G06F 21/602* (2013.01); *H04L 67/06* (2013.01); *H04L 67/1097* (2013.01); *H04W 4/021* (2013.01)

(58) Field of Classification Search
CPC ............. G06F 21/602; G06F 11/3006; G06F 11/3476; G06F 21/72; G06F 21/88; G06F 21/86; G06F 21/6218; H04L 63/0428; H04L 67/06; H04L 67/1097; H04L 41/069; H04L 41/24; H04W 4/021; H04W 4/38

See application file for complete search history.

(56) References Cited

U.S. PATENT DOCUMENTS

2010/0031349 A1*  2/2010  Bingham ................ G06F 21/31
                                                              726/20
2019/0149341 A1*  5/2019  Robison ................ H04L 63/045
                                                              713/156

\* cited by examiner

*Primary Examiner* — Huan V Doan
(74) *Attorney, Agent, or Firm* — Franco De LiGuori; DP IP Group

(57) ABSTRACT

A robot for data logging is described as a module of a portable data transfer system for use in physically transferring very big amounts of data in secure, fast and cheap way. The data logger logs and optionally analyzes sensory and operation data by statistically correlating and combining data, events, and control data from a variety of system modules, user actions, and sensors used to track system transit, handling, operation, and events. The data logger allows forensic analysis and comparison against a mission description to identify system location, transit path, mishandling, tampering, security breaches and problems arising from environmental conditions, design problems, etc. As a result, persons or events causing problems can be identified, retrained, and rectified, and system debugging can solve problems with error in hardware and software. Furthermore, decision and actions can be taken by the robot or by remote control to protect stored data from unauthorized access from third parties, such actions can include destruction of operating keys repository, electrical destruction of storage modules, system shutdown etc.

20 Claims, 6 Drawing Sheets

(51) Int. Cl.
*H04L 29/08* (2006.01)
*H04W 4/021* (2018.01)

ROBOT FOR DATA LOGGING PERTAINING TO TAMPERING PROTECTION AND PHYSICAL HANDLING OF PORTABLE SERVER SERIOUSLY MASSIVE STORAGE SYSTEM

TECHNICAL FIELD

The present disclosure relates to data logging robots and techniques for data logging of readings and events related to tamper protection and physical handling of portable storage systems of very big data for use in forensic analysis, operational-performance evaluation, and debugging for taking decisions and actions.

BACKGROUND

The last few years have seen a huge expansion in the creation and consumption of data for professional and recreation purposes. Such data are typically stored locally and more recently with the advent of fast data networks they are increasingly stored at remote servers and data warehouses.

Web-services and cloud computing have transformed computing applications and have created a wave of network storage offering ubiquitous access, increased security and in many cases lower costs. All these are supported by fast and relatively cheap data networks.

There are, however, situations where data transfer cannot be supported by existing communications infrastructures for being very time consuming or very expensive. One may consider bringing a private data center dataset to the cloud. Other examples are bringing hospital or public archives to the cloud or transferring them to central servers like government infrastructures.

These are one-off or recurring tasks and necessitate a different approach to ordinary data transfers. An example of such non-recurring tasks is moving very large amounts of corporate data of a client corporation from a first cloud storage provider (where the corporation is already storing its data) to a second cloud storage provider as a result of a better offer by the second provider for hosting and migrating the corporate client's data. An example of such recurring tasks is moving very large data sets, e.g. on a weekly basis, from offshore vessels performing oil and gas exploration, or maritime research to headquarters, or from mining installations to headquarters, police electronic crime units transferring large data sets from crime scenes to their unit infrastructures, etc.

One approach to perform such data transfer tasks is the use of large portable storage devices which physically transport data from their original location to their destination. However, such systems pose serious risks as they are susceptible to theft, brutal force decrypting, hacking of the massive storage device, adding malicious software or adding man-in-the-middle hardware and software, tampering and physical damage due to poor handling during transit.

There are approaches to track transiting portable storage systems, however, they are not safe enough to guarantee the security of the data (e.g. according to the EU's General Data Protection Regulation (GDPR) new strict rules for personal data protection) or their physical integrity as data may not always be available due to hardware damage. Both problems can have significant legal and financial implications that can ruin the data transfer business and the corporate image of data transfer providers and data owners.

Another problem related to data transfer is related to quickly making huge amounts of data available in disaster scenarios. For example, in the event of a major earthquake rescue etc. services need to quickly set up computing infrastructures at the area of disaster and have access to huge amounts of data. This is not practical given the fact than network infrastructure may be destroyed and what is left of it is usually so congested with traffic from other contenders that cannot handle large data transfers.

Another problem existing in the corporate world is the destruction of a corporate data center (e.g. due to fire or malicious act). There is an urgent need for the corporation to quickly restore its data in order to continue business as usual. Despite having its data on the cloud, it is very likely that not all its data are on-line and not all of its data are up-to-date.

What is needed is a robust, safe and always available (as much as possible when force majeur is taken into account) solution that can safeguard transited data and portable transit system integrity.

The present innovative solution solves these problems and can help the industry expand and provide very competitive services as opposed to "traditional" network transfer of huge data sets. Additionally, the present innovative solution may solve similar security and handling problems when such portable storage or server systems are used to process at the edge of the network data from sensors or local data processing loads such as virtual machines or virtual desktops.

SUMMARY

A robot having the form of a data logging module for use in portable huge data transfer or processing systems is described. The probot is designed to log sensory data, operational-performance data, and software and hardware errors for use in forensics analysis, system diagnostics, and system debugging. The robot is also designed to take decisions and actions to protect the stored data and the hardware and software of the portable storage system. from unauthorized access from third parties. Such actions can include destruction of an operating keys repository, electrical destruction of storage modules, system shutdown etc.

In one aspect, the data logging module simply logs data for analysis by the data logging module or by a cloud or forensic analysis server. The logged data are transferred wirelessly, or by wire, or by the means of a portable memory module (e.g. a secure Digital (SD) memory card) to a forensic analysis computing unit that can be local or in the cloud. All data transfers are encrypted for safeguarding the sensitive data against unauthorized access and modification.

Such safeguarding is achieved by restricting the ability of unauthorized persons to "touch" the stored data and keeping a security data logger logically and physically separated from the rest of the data storage system. This way, it is impossible for the security data logging system to access the stored data or the mechanism that encrypts and decrypts these data. So, the security system of the data logger is like an external wrapper of the actual server system that does the encryption, storing of data and decryption for handing back the information to the user. This isolation serves the aim of protecting without interfering with the actual information being moved.

In another aspect the data logging module has logic and runs software to locally analyze the raw data.

The data logging module is implemented as an embedded system or embedded ASIC communicating with other embedded modules of the portable system over a multi-master bus. Such a design provides for limited system functionality even in the event of module failures, while allowing hot plug-in and unplugging of modules.

In another aspect the logging module logs data relating to emergency system actions like shutdown. These emergency actions may be in response to analysis of sensory and operational data indicating dangerous operating or environmental conditions. Such actions are taken for a) protecting stored data by e.g. wiping-off stored data, physically destructing storage modules or operation keys repository in the event of tampering with the system or trying to hack stored data and b) protecting system hardware by e.g. system shutdown on high environment temperature or high humidity.

The data logging mode logs data from position detection sensors like Global Navigation Satellite System (GNSS) (like Global Positioning System (GPS), Globalnaya Navigatsionnaya Sputnikovaya Sistema (GLONASS), Galileo, etc.) and combines them with data from communications satellites, cellular networks, WiFi hotspots and FMRDS to improve positioning accuracy or to allow positioning where GNSS or signals from other technologies are not available, and to ensure that external tampering with one of the location methods used will not result in erroneous tracking of the portable storage system (e.g. in a situation where a false GNSS signal is transmitted to fool the tracking of the portable storage system). Other technologies are also used to cater for locations where FMRDS signal reception is not available, such as Digital Audio Broadcasting (DAB) digital radio, Digital Video Broadcasting Terrestrial (DVB-T) Tele-Vision (TV) transition signals or VHF beacon signals for air traffic guidance. Other wireless signals may also be used in alternative exemplary embodiments. All the above wireless technologies are used to capture the electromagnetic "signature" of the area the portable storage system is operating in and from this information to (1) validate position (i.e. if the GNSS reports location Athens, Greece it should receive Athens based FM radio stations, TV stations, air traffic beacons, WiFi hotspots etc. thus validates approximately the location) and (2) actual approximate position of the portable storage system in the absence of other position estimation means (e.g. GNSS).

The data logging module also logs data from thermometers, barometer, humidity meter, accelerometers, gyroscope, system and disk power current drain, micro-switches, magnetic, ambient light and optical sensors and correlates them, using specialized algorithms for the task or means that employ artificial intelligence technology, with the previous types of sensor data for identifying patterns of poor system handling during transit, unauthorized user intervention, hazardous environmental and operating conditions and, in general conditions and events that pose a threat to the safety of the system or the data to be transferred under a service agreement.

Data logging is always time-stamped using a real time clock equipped with a battery for uninterrupted operation. Inside the data logger there is a real time clock that synchronizes every time it is possible through internet time servers and there is a time stamp on all recorded measurements in order to allow to statistically correlate data to indicate events or identify repeated patterns of interest to the data owner.

Collected sensory etc. data are stored inside the portable massive storage unit in a memory card (e.g. an SD memory card) and/or a flash memory, as well as the most recent data in the internal flash memory of the microprocessor and at the same time a digested version (i.e. processed) and/or the entire raw data are being relayed wirelessly (by means of GSM, Satellite Link or WiFi) to a forensic analysis cloud server. In another aspect, such data transfers can also be performed through a wired connection to a local collection server for redundancy purposes.

As a result of the system design and operation, the portable data transfer system can be traced at all times and locations, conditions, actions and events can always be traced back and forensically analyzed to uncover the root of problems, and help take corrective and preventive actions, including system reconfiguration, debugging, and personnel retraining.

Further to tracking system operation and transit, the proposed innovative solution also provides for regulating the use of the portable storage system only by authorized personnel and/or only at allowed areas and at predefined time frames. For example, the proposed solution uses geo-fencing solutions, where the system owner or client providing data transportation services sets a "Mission Scenario". Such a mission scenario may define a scenario of use of the system where for example:

1. The client creates a "Mission scenario" in a cloud server using a web GUI. The GUI is used to set all the known locations (i.e. waypoints) that the system will be visiting from its shipping until its return to the client (or system owner), the geo-fence area around each defined location and the time slot that the system will be present in these locations inside each geo-fence way point.
2. The client then identifies in which of the defined locations the system will be allowed to operate and/or execute certain tasks, and he defines conditions or scenarios of operation (e.g. allow system operation at geo-fenced area around $1^{st}$ waypoint, in time slot 10:00-14:30 hours, on Tuesday 23 March, and so on for the remaining geo-fenced areas, etc., if system y×z sensor reading ranges are detected, etc.)
3. In an alternative exemplary scenario, at each geo-fenced area the client may define a set of passwords which is loaded to the system and which the on-site system user must enter in a front panel of the system in order to operate the portable storage system.
4. The Mission scenario is then loaded wirelessly (using any of the communication methods available at the portable storage system) to the portable storage system from the cloud server, where the mission scenario includes the parameters needed (location coordinates, geo-fence area, time slots related to each location, passwords, synchronize data logger real time clock, GNSS ephemeris data pre-load etc.).
5. The portable storage system is then shipped to its destination. During shipment, the portable storage system checks at regular time intervals the location of the portable storage system, verifies the location using the pool of available location data and reports back to the cloud server.
6. In order to be operated, the portable storage system needs to be at a location inside an allowed geo-fenced area, during the correct time slot, to have passed through all previous waypoint geo-fenced areas during the respective correct time slots, and to have the preset password entered by its on-site user. In an alternative implementation the portable storage system communicates with the cloud server to get the final verification of location and "Green Light" signal to operate.
7. If any of the above steps is missing or the corresponding conditions are violated then the portable storage system locks and the massive storage system cannot be powered up, and, in some scenarios, the portable storage system erases all its data or electrically destructs the operation keys repository which renders the device non-operational.

The mission scenario may be defined using a computing device connected by any type of network to the cloud server (client creates the mission scenario), or in alternative exemplary embodiments, using the cloud server itself (system owner creates the mission scenario).

In one aspect the mission scenario functionalities may be part of a bigger platform or may be used through an Application Programming Interface (API) so that the client has access to the cloud server mission scenario service to integrate it to a third-party system.

Such a mission is time-stamped to allow the provided allowed actions to be checked and if deviations occur (e.g. in time, in waypoints, in persons accessing and/or handling the system) to create alarms and take actions to safeguard the transiting data (e.g., erase it or destruct the operation keys repository). The mission is formatted in an encrypted control message or file which is transmitted to the portable system and is read by data logger 220. In one aspect the mission is described in a description language like XML or using proprietary commands.

Logged data are checked by the cloud server against the mission to verify the correct operation and handling of the system and to issue commands to the portable system (e.g. restrict use at unauthorized areas, times and persons). The reason the mission is also sent to the portable system is to enable the data logger unit to take actions in the event of failure to communicated and receive commands from the cloud server.

DETAILED DESCRIPTION

Figure 1:
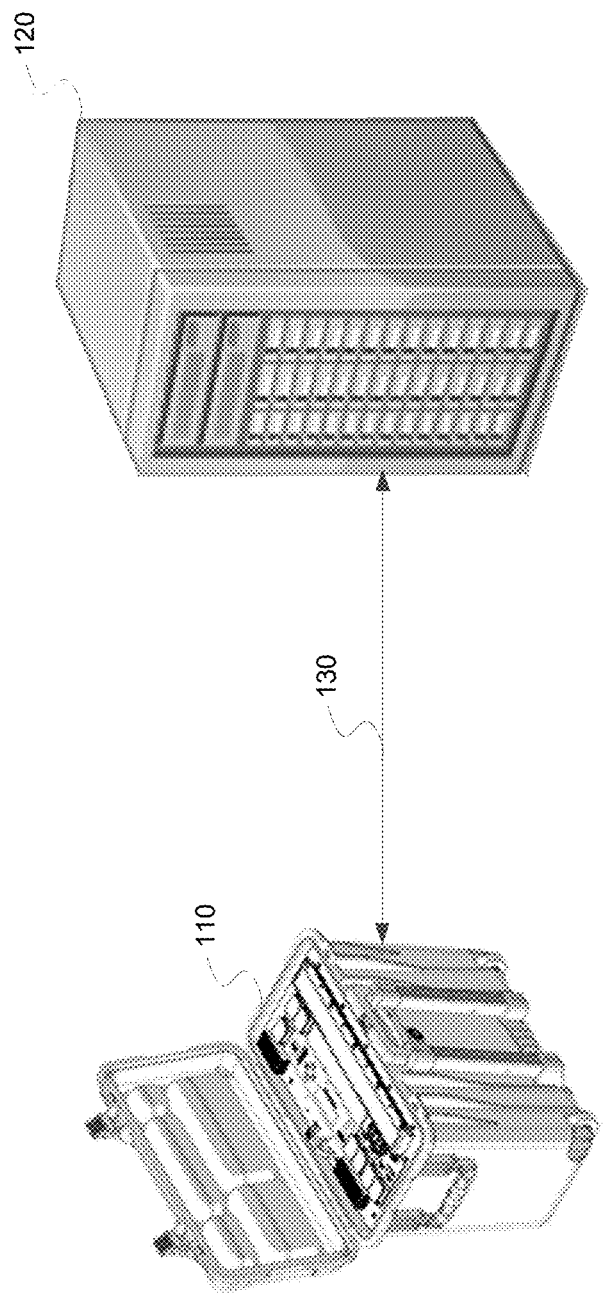
FIG. 1 shows a block diagram of a portable hugely massive storage system connected to a local mass storage system.

The word "exemplary" is used herein to mean "serving as an example, instance, or illustration". Any example described herein as "exemplary" is not necessarily to be construed as preferred or advantageous over other embodiments.

The words "transit", "shipment" and "transportation" are used interchangeably to mean "movement from a first location to a second location" unless otherwise specified.

The acronym "ASIC" is intended to mean "Application Specific Integrated Circuit".

The acronym "CPU" is intended to mean "Central Processing Unit".

The acronym "CAN" is intended to mean "Controller Area Network".

The acronym "CPU" is intended to mean "Central Processing Unit".

The acronym "USB" is intended to mean "Universal Serial Bus".

The acronym "TPM" is intended to mean "Trusted Platform Module". TPM is based on ISO/IEC 11889, i.e. an international standard for a secure crypto-processor which is designed to secure hardware through integrated cryptographic keys.

The acronym "MOSFET" is intended to mean "Metal Oxide Semiconductor Field Effect Transistor".

The acronym "SED" or "SEDs" is intended to mean "Self Encrypting Drives"

The acronym "DAB" is intended to mean "Digital Audio Broadcasting".

The acronym "DVB-T" is intended to mean "Digital Video Broadcasting Terrestrial".

The acronym "TV" is intended to mean "Television".

The acronym "ASIC" is intended to mean "Application Specific Integrated Circuit".

The acronym "IC" is intended to mean "Integrated Circuit".

The acronym "GDPR" is intended to mean "General Data Protection Regulation".

The acronym "APRS" is intended to mean "Automatic Packet Reporting System".

The acronym "GPS" is intended to mean "Global Positioning System".

The acronym "GNSS" is intended to mean "Global Navigation Satellite System.

The acronym "GSM" is intended to mean "Global System for Mobile communication".

The acronym "FMRDS" is intended to mean "Frequency Modulation FM Radio Data System".

The acronym "UPS" is intended to mean "Uninterruptible Power Supply".

The acronym "I/O" is intended to mean "Input/Output".

The acronym "EMF" is intended to mean "ElectroMagnetic Field".

The acronym "DSP" is intended to mean "Digital Signal Processor".

The acronym "FPGA" is intended to mean "Field Programmable Gate Array".

The acronym "SD" is intended to mean "Secure Digital".

The acronym "VHF" is intended to mean "Very High Frequency".

The acronym "MCS" is intended to mean "Modular Control Sub-system".

The acronym "MCSDL" is intended to mean "Modular Control Sub-system with Data Logging".

The acronym "MSS" is intended to mean "Massive Storage Sub-system".

The acronym "DGP" is intended to mean "Device Getaway Platform".

The acronym "PCU" is intended to mean "Power Control Unit".

The acronym "NFS" is intended to mean "Network File System".

The acronym "NAS" is intended to mean "Network Attached Storage".

The acronym "SAS" is intended to mean "Serial Attached SCSI".

The acronym "SCSI" is intended to mean "Small Computer System Interface".

The acronym "DIMM" is intended to mean "Dual In-line Memory Module".

The acronym "SSD" is intended to mean "Solid-State Drive".

The acronym "HDD" is intended to mean "Hard Disk Drive".

The acronym "SAS" is intended to mean "Serial Attached SCSI".

The acronym "SATA" is intended to mean "Serial Advanced Technology Attachment".

The acronym "GUI" is intended to mean "Graphical User Interface".

The acronym "API" is intended to mean "Application Programming Interface".

The acronym "SED" is intended to mean "Self Encrypting Drive".

The acronym "PCB" is intended to mean "Printed Circuit Board".

As used herein and in the appended claims, the singular forms "a," "and," and "the" include plural referents unless the context clearly dictates otherwise.

The term "WEB GUI" is intended to refer to an open source content management system written in Perl and released under the GNU General Public License.

The term "WiFi" is intended to refer to wireless local area networking with devices based on the IEEE 802.11 standard.

The term "NAS" is intended to mean "Network-Attached Storage".

The term "OS" is intended to mean "Operating System".

The terms "3G", "4G", and "5G" are intended to refer to the "third", "fourth" and "fifth" generations of wireless technologies, i.e. cellular telephony networks, respectively.

Unless defined otherwise, all technical and scientific terms used herein have the same meaning as commonly understood to one of ordinary skill in the art to which this invention belongs (computers, data storage, sensors, data processing). Although any techniques similar or equivalent to those described herein can be used in the practice or testing of the invention, the preferred techniques are described.

The present innovative solution teaches a forensic logging module that oversees the operation of a portable massive storage system. Such a system typically comprises at least one mass storage module which can store huge amounts of data, in the order of 50+ or hundreds of terabytes, petabytes and upwards. Such portable massive storage systems can find applications where excessively high amounts of data need to be backed up or transferred to remote infrastructures like remote servers, databases, data warehouses, data farms, cloud storage etc. The usual way to transfer data is via a wired or wireless network of any type available. Nevertheless, as the amount of data (e.g. >50 terabytes or hundreds of terabytes, or petabytes or more) is excessively large, and the available data networks are rather slow (e.g., several Mbits or even 1 Gbit per second) it is often not practical to transfer such data over data networks.

Usually, such data transfers are not part of routine operations but one-off or periodically occurring events and this is the reason for the huge data size. Applications include hospitals, military, governments, large corporations, off shore operations, mining, public archives, etc. By means of example, imagine a central health data repository where a new hospital data repository is being integrated into. The hospital typically has a data repository storing all patient records over a period of several years, which records comprise among other data all the medical imaging data from scanners like Magnetic Resonance Imaging (MRI), Computed Tomography (CT), Ultrasound, etc. Even small hospitals may hold thousands of patient folders and hundreds of thousands of medical imaging data of several hundred MBs each. Transferring these data from the hospital local storage to the remote central storage needs to be done once and thereafter new data can be regularly transferred, where the regular transfer refers to sizeable amounts of data and can, therefore, be implemented over a data network. In an alternative scenario, the data transfers are repeated e.g. weekly or monthly.

In order to perform one-off or periodic transfers of huge amounts of data, the current innovative solution proposes a portable massive storage system where data are uploaded over a wired connection at the hospital from the local data storage. The portable massive storage system is first shipped to the hospital from a provider of such data transfer services, the storage system is loaded with the data to be transferred, and the portable system is then shipped to its destination where the data are then transferred over a wired link to the destination storage, before the portable system is wiped off of the transferred data and encryption keys and is shipped to a second destination for a new data transfer.

In an alternative exemplary scenario, the portable storage system is used in a setup involving Internet-of-Things (IoT) related data. In such a scenario, very large data sets are generated by IoT devices in an offshore Oil Rig. These data are first processed and then uploaded to the cloud using a first portable massive storage system. In this scenario, a copy of the raw and processed data is kept at the offshore oil rig storage system, while another copy is stored at the first portable storage system and every time the portable storage fills up, the first portable storage system is exchanged with a second portable storage system. This way the second portable storage system continues IoT data collection and processing while the first portable storage system is shipped to a cloud datacenter to offload the raw and processed data collected. The two portable storage devices are then continuously rotated.

Data are being encrypted while uploading them to the massive portable storage unit (i.e. to the Massive storage Sub-system (MSS) in order to minimize the possibility of the data being stolen. To further increase data security, the MSS has an encrypted boot disk and a secure booting mechanism that prevents unauthorized software to run on the system.

In addition to the above two security mechanisms, an additional layer of security exists, which security layer is implemented by a crypto-processor, e.g. according to the ISO/IEC 11889. The crypto processor stores the key to decrypt the boot disk and when the system boots, the crypto-processor checks if the firmware of the motherboard is unchanged (by checking the signature of the firmware) and then provides the key to decrypt the boot disk and boot the system. The crypto-processor also checks the signature of the Operating System (OS) before it loads the OS. Thus, there is no possibility for someone to have changed or added something in the system while the system was dormant.

In an alternative implementation the system is equipped with one or more Self Encrypted Disks (SEDs) which they need a key to unlock before boot. This key is stored inside the crypto-processor and the key is provided by the crypto-processor to the disks to unlock during boot after all the above signature checks have been passed. The key is also used by the crypto-processor to unlock the NAS OS boot.

The result of the above security approach is that data are being encrypted twice: a first data encryption is done by the NAS OS when the data are ingested to the portable storage system, and a second data encryption is done by the SEDs themselves. On top of the double data encryption, the crypto-processor holds and encrypts the keys to unlock the NAS OS boot and the SEDs, therefore adding additional security layers on top of the double data encryption. The present innovative solution allows the system owner, a remote control server, or the data logger of the portable storage system to destruct the crypto-processor and consequently destruct all the encryption keys stored in the crypto-processor. Loss of the keys then results in loss of system operation and, as a result, the intruder will have an additional burden to pass to get his hands on the stored data. The intruder will have to remove the platters from disks (because the disks are locked without the key stored in the crypto-processor, and the disks appearing as empty), to find a way to read and decrypt the data that were encrypted by the disk itself. We have to note here that a) the NAS OS typically encrypts incoming data to the MSS, in other words original data are encrypted once during ingest, and b) are re-encrypted during disk writing inside the SED disks. The keys for the first data encryption step are held by the user and the second keys for the SED drives data encryption are stored at the SEDs, while the keys to unlock the SEDs and the NAS OS boot are kept inside the said crypto-processor while the key itself is being encrypted again. This "double-double" security, encrypt twice the data and encrypt the keys for the disks, forces the intruder to have to decrypt twice the data to get access to the stored information. Data encryption is done using the latest known encryption techniques, which achieve almost perfect safety for the data and by encrypting the data twice we multiply the safety by a power of 2. However, no encryption method is 100% safe (given enough time to break the encryption code). For this reason, the need to really know the whereabouts of a client's data during the time to ship them to their destination is very critical.

Encryption is also used in all internal communication between system modules of the portable storage system (i.e. inside the Modular Control System with Data Logging (MCSDL). Such communication includes firmware updates. These updates are signed and encrypted thus no one can flash an unauthorized firmware and install it at any system module, therefore, data integrity and system operation are better protected. In addition to encrypted firmware communication, all data and control data transmissions between system module are encrypted with Time-based One-Time Password algorithm (TOTP) so as to ensure that if an unauthorized module is plugged into the system this will not be able to communicate or copy data from the other (authorized) system modules.

As a result, since all communications are encrypted, modules cannot be misled with fake messages, man-in-the-middle or data repeat attacks.

Shipping the portable storage system may typically be done by any courier, transportation or similar service offered by the data transfer service provider or any third party. Appropriate handling is needed to safeguard the precious data and the electronics of system 200. In an exemplary embodiment, the portable storage system is implemented as a Network Attached Storage (NAS) server, which server is basically a Xeon computer (i.e. a 400 MHz Pentium™ microprocessor from Intel™ for use in midrange enterprise servers and workstations) equipped with a Trusted Platform Module (TPM) i.e. a crypto-processor which holds the operation keys of the NAS server and authenticates the Operating System boot signature, the motherboard firmware signature etc. The TPM also provides the encrypted boot disk key, self encrypting hard disks keys etc. The TPM module is installed in PCB with a microcontroller, it is equipped with a battery and it is installed with a metal mount protected with a box; the PCB with the TPM is covered with resin for preventing tampering.

The NAS server communicates with one or several hard disks (or Self Encrypting Drives, or SSDs, or NVMe SSDs etc.) attached to it through a Serial Attached SCSI (SAS) controller (i.e. a point-to-point serial protocol that moves data to and from computer-storage devices such as hard drives and tape drives), and the computer runs on the Linux Operating System (OS) with ZFS (i.e. a combined file system and logical volume manager designed by Sun Microsystems™, now owned by Oracle™) and Linux Unified Key Setup (LUKS) (i.e. a disk encryption specification created by Clemens Fruhwirth™). In alternative exemplary embodiments, other types of hardware and software architecture are used together with other hardware components and operating systems.

Although such a portable massive storage system, as the one used in the above use case, seems a simple up-scaling of the cheap and widely used portable storage devices (like Universal Serial Bus (USB), flash-memory or disk storage devices), one has to appreciate that the two storage solutions have few common features other than that they are both used for portable data storage.

Portable massive storage devices apart from huge capacity need to have very sophisticated data security mechanisms, apart from being encrypted, be tamper proof both physically and digitally, be traceable, redundant, and allow remote operational monitoring and automatic local operational supervision and management, while at the same type offer reliable protection against environmental and handling hazards.

System Hardware Architecture

FIG. 1 shows a block diagram of a portable hugely massive storage system connected to a local mass storage system. Portable hugely massive storage system 110 is moved on-site and connected via wired network 130 to local mass storage system 120. The wired connection is preferable to wireless connections for the significantly higher throughput of wired connections over wireless connections, though wireless data transfer could be used in alternative embodiments. By means of example, the wired link may comprise any fast-wired data bus or preferably an optical link. The exact protocol of the chosen link is beyond the scope of this innovative solution and any such protocol may be used. Once the portable and the local storage system are connected, the data from local storage system 120 is transferred and stored at portable storage system 110. Upon completion of the data transfer, portable storage system 110 is disconnected from system 120 and shipped to the destination storage location. In another aspect, partial data transfers are performed.

The block diagram of FIG. 1 may also be used to illustrate the connection of portable storage system 110 with the destination storage system which destination storage system replaces local storage system 120.

Figure 2:
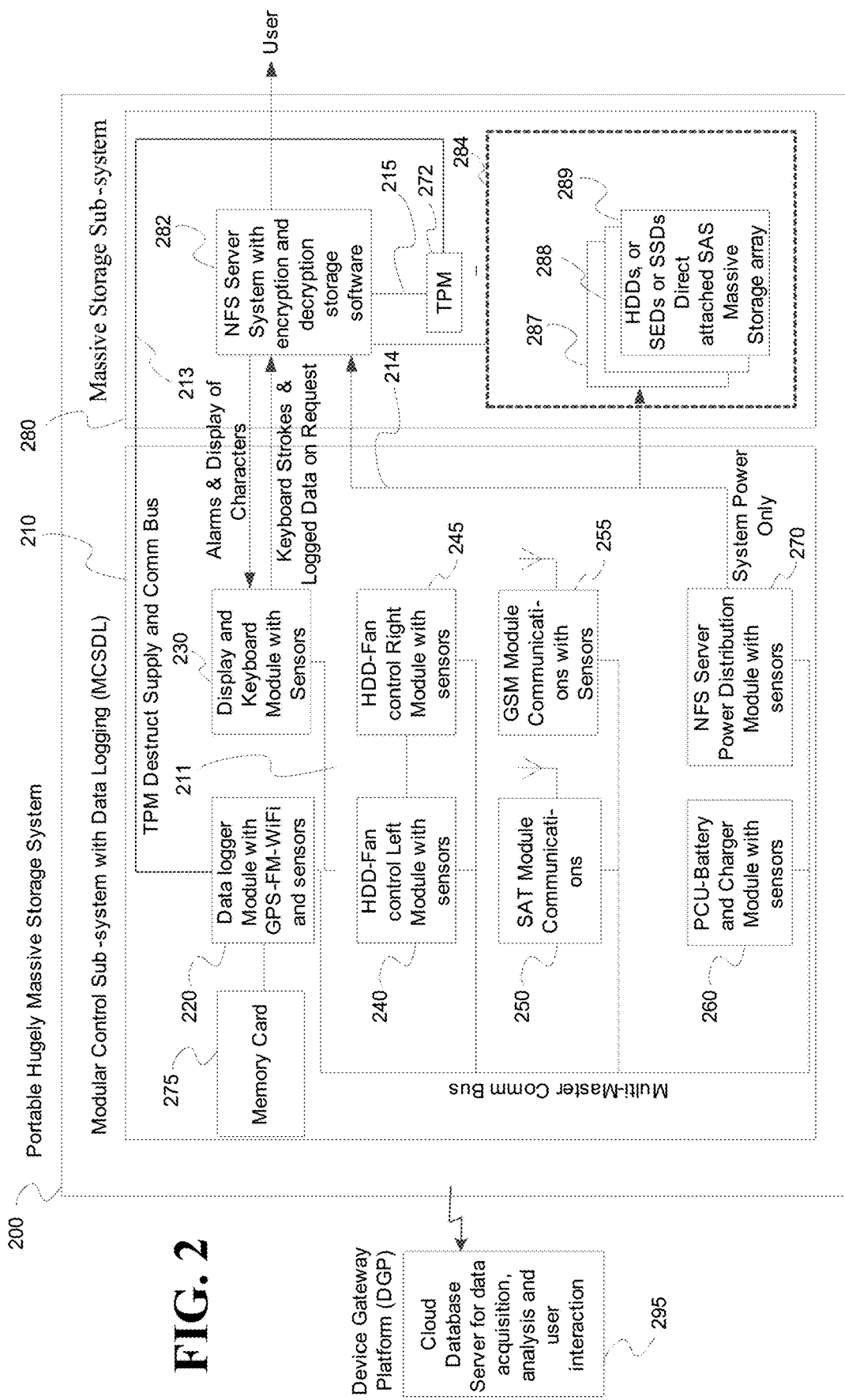
FIG. 2 shows a hardware architecture block diagram for the portable hugely massive storage system.

FIG. 2 shows a hardware architecture block diagram for the portable hugely massive storage system. Portable hugely massive storage system 200 comprises a series of modules 210-289 for data storage, operational monitoring, control operations, security, and protection operations. These modules may be substituted for other similar modules, while some or all of these modules may be duplicated for ensuring uninterrupted operation in the event of failure of a module, or for increasing a module's capacity and capabilities as in the case of storage modules 284 (FIG. 2 illustrates, for simplicity, an exemplary embodiment with storage modules 284 implemented with 3 storage modules 287, 288, 289. In alternative exemplary embodiments the number of storage modules may be modified, as for instance 6 storage modules arranged in a left unit canister, and 6 storage modules arranged in a right unit canister, each canister or storage module having at least one cooling fan).

Modules 220-270 are connected to each other via a data bus 211 and each module has a microcontroller that controls its operation and interfaces with the data bus.

System 200 may be logically divided into two sub-systems. A Modular Control Sub-system with Data Logging (MCSDL) 210 and a Massive Storage Sub-system (MSS) 280. MCSDL 210 is made up of modules 220-275 and MSS 280 of modules 282-289. Part of system's 200 functionalities are located into a Device Getaway Platform (DGP) 295 which is implemented as a Cloud Database Server, and which server performs data acquisition, analysis and user interaction and is in communication with portable system 200. Cloud server 295 has a database for storing logged data from system 200, which data comprises location, operation, and other information collected by sensors on system 200.

MCSDL 210 has a Data Logger Module 220, which module also contains Global Navigation Satellite System (GNSS) and Frequency Modulation Radio Data System (FM RDS) receivers and Wireless Fidelity (WiFi) transceivers and multiple sensors. In other exemplary embodiment, WiMax, or ZigBee (IEEE 802.15.4), or amateur band Automatic Packet Reporting System (APRS) transceivers are also used with the data logger. The transceivers are used first for exchanging data with external systems (including DGP 295) and also for using control data from external systems to geo-locate portable storage system 200. Additional or alternative transceivers may be used in alternative exemplary embodiment. The sensors of module 220 are used to sense operating conditions, physical and operational opening and closing of system 200, physical relocation of system 200, tampering with the system hardware and data, operating parameters and other. Data logger module 220, contains a microcontroller with a mathematics coprocessor to control its operation and the operation of system 200, and data logger 220 logs its data at an external flash memory and at a memory card 275. In alternative exemplary embodiments, logged data may also be stored at the storage modules where the client's huge amounts of data are stored, e.g. in a sandboxed subset of the storage modules. All logged data are time stamped to facilitate data cross-correlation and analysis to track the whereabouts and handling of portable storage system 200.

At the same time, logged data are transmitted to Device Gateway Platform (DGP) 295 via a WiFi network, using Virtual Private Network (VPN) connections. The MCSDL subsystem uses a persistent strategy to communicate with the DGP:

1. the MCSDL first tries to connect with the DGP and establish an encrypted communication link using WiFi when it finds an open WiFi hotspot.
2. If a WiFi connection is not possible, the MCSDL starts the GSM modem and tries again to establish an encrypted link with the DGP
3. If neither a WiFi nor GSM link can be opened, the MCSDL tries to establish a Satellite connection. The system may have also other communication devices such as WiMax, or ZigBee (IEEE 802.15.4), or amateur band Automatic Packet Reporting System (APRS), etc.

A WiFi transceiver continuously collects the SSiDs of the surrounding WiFi networks with their respective signal strengths as an alternative location positioning mechanism. This function will require DGP Cloud server 295 to find the location of the device by using an external database that has documented all the SSiDs of the WiFi spots with their respective position (DGP server 295 keeps a database with such WiFi data and can search and retrieve new such data from the Internet).

If a WiFi VPN connection cannot be established with DGP 295, GSM transceiver module 255 is used to connect to DGP 295 using the data layer of any available cellular network, e.g. GSM, GPRS, EDGE, 3G, 4G, 5G, etc. If a cellular network is not available, data logger 220, attempts to transmit its data using satellite communications module 250. If unit 250 is employed to transmit data, data logger 220 prepares a compressed or a summary data log to transmit for reducing the significant costs associated with satellite networks. In the event where no wireless logged data transmission can be achieved (e.g. due to network unavailability, damage of the respective antennae, electromagnetic interference, or intentional shielding of portable storage system 200 for cutting off its wireless communication with the outside world), data is still logged at the three system storage locations, and are transmitted when a wireless connection becomes available or are transferred by wire or by memory card when system 200 reaches its destination.

Cellular network connections are also used to receive encrypted messages (or mission scenarios) from DGP Cloud server 295, which messages contain commands such as full system lockdown, or data erasure in the event of a risk for the data and system is deduced from sensory data by using, for example, self destruct Solid State Drive (SSD) storage devices or by overwriting data or by destructing the TPM crypto-processor (inside TPM module 272), which crypto-processor holds the operation keys of the MSS system.

All storage and transmissions of logged data are done in encrypted form for protection. Encryption (and decryption) is done by software at MSS subsystem 280. This approach not only safeguards logged data but uses 3 different mechanisms to deliver logged data to DGP 295 (at real time via wireless transmission or with physical means via wired transmission or using memory card 275) in case any of the methods fail. As an additional safety feature to guarantee the integrity of logged data, memory card 275 is isolated from data logger module 220 and protected in a ceramic casing with insulation from fire. Thus, memory card 275 will survive in case of fire that might destroy the whole of system 200. In essence, memory card 275 is acting like a black box for system 220.

Data logger 220 also has a backup battery or a super capacitor to be able to log the last captured data safely in case of sudden power loss from system's 200 main battery. Based on the type of battery or capacitor used, power will be made available for a few seconds up to a few minutes, so as to first try to destruct the TPM crypto-processor inside TPM module 272 and then allow the data logging to be completed or even be transmitted to cloud server 295. In the latter case data logger module 220 becomes a master module commanding the transceiver modules to transmit data to cloud server 295.

TPM module 272 is equipped with an additional battery and in case the microcontroller of TPM module 272 that controls the TPM processor is not able to establish secure communication with the microprocessor of Data-Logger module 220 for a few seconds (e.g. 10 seconds), the microprocessor of the TPM module assumes that the system is being compromised and destructs the TPM crypto-processor.

Modular control subsystem 210 contains a display and keyboard for user interaction, as well as, sensors for detecting handling and operating conditions of system 200. Display and keyboard module 230 has a microcontroller with CAN bus and Universal Serial Bus (USB) interfaces (other connections are used in alternative exemplary embodiments), which microcontroller drives, in one aspect, a DOT Matrix Organic Light Emitting Diode (OLED) display with 4×20 characters and a 4-key keyboard for user interaction (other types of display and keyboard are used in alternative exemplary implementations). Modular control subsystem 210 connects to massive storage subsystem 280 with the USB interface and an associated USB connector for receiving alphanumeric characters from massive storage subsystem 280 and displaying them at its screen and for sending keystrokes from its keyboard to subsystem 280, and logged data requested by subsystem 280. The same USB interface and connector are used to send new Firmware to the Display and Keyboard Modules and to the other system 200 modules for updating the Firmware on these modules, and for sending the system clock to data logger module 220 (system clock is also synchronized using satellites from GNSS). The data and firmware exchange operation between the two subsystems is controlled by the Display and Keyboard Module. The system clock is retrieved by a daemon running on the MSS sub-system—which daemon tries to communicate with the Internet and/or with predefined time synchronization servers—and sends the system clock time to the Data Logger module.

In an alternative exemplary implementation, remote Firmware updates are made by transmitting them in encrypted (and optionally compressed) form from the cloud server to the system transceivers which relay the received updates to the microcontroller of the display and keyboard module 230.

Display and keyboard module 230 also sniffs the signals of the motherboard (e.g. a XEON motherboard inside the MSS) in order to understand the motherboard's operational status, i.e. the speaker to monitor and count the error beeps, the power on signal, the fan failure led etc.

Display and keyboard module 230 also drives indication Light Emitting Diodes (LEDs) for system locking and other functions. These LEDs are located inside and outside the case of system 200. LED signals and audio sounds (e.g. beeps) from NFS server's 282 motherboard in subsystem 280 are received by the microcontroller of display and keyboard module 230, which then reproduces them on the display and external LEDs.

In addition to the above features and functions, display and keyboard module 230 also contains sensors like:

a temperature sensor to monitor the internal temperature of the system a proximity sensor to sense if the lid cover of system case enclosing the system) is closed or open in order to alarm the system user if it's accidentally closed while the system runs. If the lid is closed while normal system operation (e.g. when the system's storage modules are operating) the system will overheat since the fan outtakes will not be able to extract the heat from the hardware modules and expel it from the system. At power save operation (i.e. when storage modules are powered off and all other modules operate at sleep mode and periodically awake for operation) the system is designed to operate with closed case lid without overheating, as the power consumption is drastically reduced.

In one aspect the keyboard is a limited key keyboard while in another aspect it is a standard keyboard or graphical keyboard displayed on the module's display. In one aspect the display is an alphanumeric display, while in another aspect is a monochrome or a color display, or a touch screen.

Module 240 is a controller module for a fan or set of fans on the left side storage modules canister, while module 245 is a controller module for a fan or set of fans on the right side storage modules canister. Both modules 240, 245 contain sensors like:

temperature sensors to measure the temperature of storage modules 284 an accelerometer to sense the shocks that storage modules 284 have suffered during transportation and, as well as, when hard disk drives are used for storage modules 284, to sense from the vibrations the hard disks are generating while they are accessed, when and if the hard disks have been accessed during transport. In this way the data logger can detect when the disks were transferring data (since accessing the disk causes the head to move thus it creates vibrations) and document vibrations for subsequent correlation (at cloud server 295) of this information with location information thus deducing the occurrence of unauthorized data access attempts.

Modules 240, 245 control the fan speeds and the health of the two fan sets that are responsible to cool the storage module canisters on each side of system 200 by measuring the tachometer output of the fans and the current drain of the fans.

Module 250 is a satellite communications module with integrated antenna, which module allows MCSDL 210 to communicate via satellite link with DGP 295 for continuously (at predetermined intervals) transmitting logged data from the sensors of MCSDL 210. This function is possible at any time during operation or shipment of portable system 200, even with its cover closed. In order to reduce costs satellite data transmission is used only when WiFi and cellular network transmission is not possible and involved compressed or summary logged data transmission.

Module 255 is GSM cellular telephony module with integrated antenna, which module allows MCSDL 210 to communicate via a cellular network link with DGP 295 for continuously (at predetermined intervals) transmitting logged data from the sensors of MCSDL 210. This function is possible at any time during operation or shipment of portable system 200, even with its cover closed. In an alternative exemplary embodiment, alternative cellular network technologies to GSM are used, such as EDGE, 3G, 4G, 5G, etc. GSM module 255 is also used for location tracking by triangulating GSM (or other cellular network) signal strengths, taking into account a priori knowledge of the location of the transmitting antennae and obstacles in the line-of-sight between these antennae and the receiver at system 200. This information can be searched and retrieved from the Internet and or stored by cloud server 295. This can be done using existing technologies like cellular network-based location systems.

In order to preserve power for extending battery time and for avoiding portable system overheating while its lid is closed, the various modules and the incorporated sensors are operated at low power. One approach is to put system modules (and sensors in some exemplary embodiments) to sleep until the system is connected to mains power or, alternatively, put modules (and sensors) to sleep (e.g. for 10-20 minutes) and periodically wake them up (e.g. for 5-10 seconds) to perform their operation (e.g., GNSS unit receives satellite signals for system positioning and sends them to the data logger). A third approach is to equip certain, crucial sensors with simple, low-power microcontrollers. Such an approach allows to power off modules consuming large amounts or power (e.g. data logger module 220) and to have crucial sensors (e.g. accelerometer) always powered on since they consume very little power without risking loosing valuable sensory data. The accelerometer microcontroller may be programmed to save all its readings to an on-board memory and generate an interrupt to wake up data logger module 220 every time the accelerometer's memory gets full or when an accelerometer reading in above a threshold. This interrupt then wakes up data logger module 220, which module then wakes up and retrieves the accelerometer data for logging and transmission to cloud server 295. Once completing its tasks, data logger is again put to sleep until the next interrupt signal is received. As a result, power is conserved, and consumption is minimized without limiting system performance for critical tasks. Similar to the accelerometer and data logger example presented above, other similar methods are used for other modules and sensors. The exact configuration of these power saving methods and of the system modules and sensors depends on the particular exemplary embodiment and is not further analyzed as it is obvious to readers of ordinary skill in related art. In certain exemplary embodiments, the power saving approach also uses transceivers in addition to sensors.

Module 260 is a Power Control Unit (PCU) which is responsible for managing the power fed to all other modules of system 200. PCU 260 has the following elements:

an electronic switch to control the power flow to massive storage subsystem's 280 motherboard and to each individual (Left and Right) storage module canister. In this way the system can cut the power and not allow an unauthorized person to turn on the massive storage system or not allow the system to be used outside of allowed locations and time slots or the function can be used as a business option allowing the owner of the system to enable remotely one set of six disks or two sets of six disks in order to double the capacity on demand and in this way to be able to charge the user of the device different cost of use of the devices depending on the capacity.

a current sensor to continuously measure the power drain of massive storage subsystem 280 thus being able to understand if subsystem 280 is being used to encrypt/ decrypt/read/write data to disks. If, at a later stage, this information is correlated (at cloud server 295, or at system 200 in alternative exemplary embodiments) with transportation and location information and the system can detect if the stored data has been accessed by an unauthorized person during system transportation. Fan power drain measurements are also used to control fan speeds and the health of the two fan sets that are responsible to cool the power supply.

two temperature sensors to measure the internal and external air temperature of the power supply a NiMh battery charger with one smart NiMh battery that powers modular control system 210 and continuously providing information about charging and discharging of the battery, as well as, current drain measurements and charging/discharging cycles of the smart battery system. This smart battery system is only used to keep alive at all times data logger module 220, PCU module 260, two HDD-Fan control modules 240 and 245, GSM 255 and SAT 250 modules while the system is off mains power.

Module 270 is a Network File System (NFS) Power Distribution Module. Its role is to distribute power to the data storage modules according to need and to conserve power, as much as possible, using data from sensors it also has, so as to extend battery time left during operation.

NFS power distribution module 270 controls fan speeds and the health of the three fan sets that are responsible to cool massive storage subsystem's 280 Xeon motherboard, by measuring the tachometer output of the fans and the current drain of the fans. NFS power distribution module 270 also has two temperature sensors to measure the internal and external air temperature of massive storage subsystem's 280 motherboard.

TPM module 272 has a first connection 215 with Massive Storage Sub-system's (MSS) 280 motherboard (via a PCI bus or other similar bus) and a second direct connection 213 with data-logger module 220 (via a second CANbus or similar bus). The TPM module has on board two micro controller units, the first is the TPM crypto-processor and the second is the micro-processor that is handling the destruction of the TPM crypto-processor. This design allows to manage (when it is needed) the destruction of the TPM crypto-processor of TPM module 272 which in turn holds the encryption keys that unlock the operation of the MSS 280.

Additionally, the TPM module carries a small rechargeable battery to be able to execute the destruction of the TPM crypto-processor regardless of there is external power or not.

At the initialization of the system operation, the microprocessor of data logger module 220 sends a first encrypted command (e.g. an ARM command) via the second CANbus directly to the micro-controller of TPM module 272. From that point onwards, the micro-processor that controls the destruction of the TPM crypto-processor assumes it is armed and operating until it receives a second encrypted command (e.g. a DISARM command) that will stop the automatic destruction of the TPM crypto-processor operation. Once the microprocessor of TPM module 272 is armed, it periodically (e.g. every 10 seconds) receives from the microprocessor of data logger module 220 a third encrypted and scrambled (using Time based One Time Password) ALL GOOD command. If this third command is not received by the microprocessor on time (e.g. in 10 seconds) then the microprocessor proceeds and a) electrically isolates the TPM crypto-processor from massive storage subsystem's 280 Xeon motherboard and then b) destroys the crypto-processor. There is also a forth command (e.g. a DESTROY command) that is used as a direct command from the data logger module 220 for the TPM module 272 to destruct the TPM crypto-processor.

TPM crypto-processor destruction is done by having the microprocessor of TPM module 272 send a high voltage signal to the TPM crypto-processor. By means of example and without limiting the scope of the present innovative solution, a 30V Direct Current (DC) signal is sent to the TPM micro-processor.

The failure to receive the third command by the microprocessor of module 272 is used to identify tampering of the portable storage system. Failure of communication between data logger module 220 and TPM module 272 could initiate the destruction of the crypto-processor and consequently render the stored data unreadable.

The power to supply this high voltage is applied by three sources, a) the smart battery located on Power Control module 260 that supports the whole modular control system 210, b) the data-logger's 220 backup battery, and finally c) from the secondary backup battery located on board of the TPM module 271, for ensuring that the required TPM crypto-processor destruction voltage will always be available when needed, even in the event where the system battery is disconnected, even if the data logger 220 is totally disconnected. This high voltage is applied via a step up switching power supply unit and a high-power Metal Oxide Semiconductor Field Effect Transistor (MOSFET) operating as a switch directly to the VDD of the TPM crypto-processor chip. Other types of switches are used in alternative exemplary embodiments.

This high voltage irreversibly destroys the TPM crypto-processor. In order to protect the motherboard to which the TPM crypto-processor is connected, TPM module 272 is electrically isolated by a switch from NFS server motherboard. In one aspect, this switch is implemented by one or more Schottky diode or by one or more Metal Oxide Semiconductor Field Effect Transistors (MOSFET). When the TPM crypto-processor has been destructed, the MSS sub-system is rendered unusable since all the unlocking keys that allow the system to boot and access its hard disk drives (when SED hard disks are used) are irreversibly destroyed.

In another aspect, TPM module 272 also has a small battery that is used in an additional safety mechanism. In the event of cutting hardware line 213 (connecting the TPM module with the data logger module and supplying the TPM module with the third command), the TPM module is programmed to use its own battery to self-destruct upon failure to detect a third command from data-logger 220 (via line 213).

TPM module 272 is programmed to receive the third command in an encrypted form and decrypt it to verify its validity. If the third message has been tampered with and a previously sent third message is sniffed and resent to the TPM module, there is additional security mechanism for allowing the TPM microprocessor to detect this tampering. This mechanism uses an One Time Password (OTP) mechanism in all three types of commands sent by the data logger to the TPM microprocessor, thereby allowing the TPM microprocessor to understand if a received command is valid and sent from the data logger. If not, the TPM processor detects tampering with the system and destroys the crypto-processor for securing the stored data in the MSS 280.

In one exemplary embodiment, TPM 272 is implemented as an Integrated Circuit (IC) board incorporating a microprocessor, switches, battery and other components. In an alternative exemplary embodiment, the TPM is implemented as an ASIC with integrated switches and a battery. Other configurations are possible in alternative exemplary embodiments. In all configurations of the TPM its hardware is enclosed in a resin that protects it and prevents access to the hardware and software by any person. In another aspect only the crypto-processor is not covered with resin for allowing its replacement in the event of a new system use or the replacement of a destroyed crypto-processor. Instead, the crypto-processor is housed on a metal base that securely holds it in place, while protecting it.

Massive Storage Sub-system (MSS) 280, in one aspect, is an NFS server system with a Xeon motherboard, Dual In-line Memory Module (DIMM) memory, boot Solid-State Drive (SSD) memory, Hard Disk Drive/Solid-State Drive (HDD/SDD) Serial Attached SCSI/Serial Advanced Technology Attachment (SAS/SATA) controller, and various networking interfaces. The NFS server also runs the Linux ZFS software that provides data encryption and a WEB Graphical User Interface (GUI) for the user.

NFS Server System module 282 connects to MCSDL subsystem 210 via:
- display and keyboard module 230 using a USB connector
- TPM module 272 via hardware connection 213 to the data logger
- and NFS power distribution module 270 via hardware connection 214

In such a way, NFS server system module 282 is physically and logically distinct from portable storage system 200 in the sense that the NFS server system module is either:
- an off-the-shelf NFS server system which runs the proprietary Operating System (OS) of choice of the client using system 210
- a proprietary NFS server system running the proprietary OS of choice of the client using system 210

Here, "client" refers to the situation where the owner of portable system 210 (and cloud server 295) leases system 210 to a client who wants to transfer data to the cloud of the owner of the device. The design of the system to have NFS server system module 282 separate from the rest of system 210 allows for the client to exclude the owner of system 200 from having access to the client's data thereby abiding to strict data privacy regulations. There can be many other business models that can be realized with the use of the disclosed technology.

NFS Server System module 282 is responsible for managing data storage in storage modules 287, 288, 289 and contains encryption and decryption storage software. This software ensures that the data received from display and keyboard module 230 (e.g. user commands) are not in any way related to the storage of the huge amounts of client data to be stored at storage modules 287, 288, 289. User commands and displayed information are only used for the facilitation of the device operation. The NFS power distribution module 270 supplies only power 214 to the NFS server system module 282 and the storage modules 287, 288, 289. The TPM module 272 gets only power 213 and four commands from the data logger module 220 these are "ARM", "DISARM", "ALL GOOD" and "DESTROY". The software of module 282 performs its tasks and encrypts client data prior to storing it so as to prevent unauthorized use or tampering with the data. The software also receives logged data from MCSDL subsystem's 210 data logger module 220 through the display and keyboard module 230 by utilizing the communication network with CAN Bus 211 and uses the information in order to inform the user for the whereabouts, the handling and possible tampering attempts of the device from unauthorized third parties.

It is noted that all system modules have multilevel failover strategies. Examples of such strategies include:
- hardware level strategies, e.g. if a micro controller hangs due to a hardware failure, the Printed Circuit Boards (PCBs) or ASICS are designed to failover the operation of the fans i.e. at full speed rather than throttle down the speed in correlation with temperature
- software level strategies, e.g. for modules that are interdepended from measurements. Assume module A needs a temperature measurement from module B to adjust the speed of a fan. If module A does not get the temperature measurement from module B, then module A assumes the temperature from other measurements it gets from adjacent modules and increases by one step the speed of the respective fan as a precaution measure Many other strategies are used depending on the exemplary embodiment. All system modules transmit to the CAN bus 211 (or any other parallel bus that is used in the system) error messages in case of a detected failure of a hardware or software component (e.g. a fan is not operating as expected in terms of tachometer speed or current drain).

The present innovative solution is directed to the functionality and operation of the data logging module 220.

Practical Considerations

Modules 220-289 are connected to each other via a data bus. Although any type of data bus can be used (like a serial or star-configured data bus), a robust bus is preferable to allow the modules to communicate with each other without the need of a host computer or microprocessor. In an exemplary embodiment, a serial bus (shown in FIG. 2) is used which bus allows the use of multiple master nodes (i.e. modules 220-289), each master being capable of getting hold of the control of the bus for performing a function that the module is designed to perform (e.g. storing a data file to a storage module). In the event of a module failure or other problem a module (e.g. data logger module 220) may take the role of master. Otherwise, the master role could be undertaken by display and keyboard module 230 when the system operates at low power during transit (with case lid closed) and other modules are asleep.

By means of example, a Controller Area Network (CAN) bus is used 211. A CAN bus is a robust bus standard designed to allow microcontrollers and devices to communicate with each other in systems without a host computer. It is a message-based protocol, designed originally for multiplexing electrical wiring within automobiles to save on copper but is also used in many other contexts. The CAN bus is used as a multi-master serial bus standard for connecting electronics hardware modules 220-270, where each module functions as a node. Other serial buses that allow serial multilateral communications may be used in alternative embodiments.

Such a multi-master system architecture and bus makes it possible for system 200 to continue operating in the event of failure of any of its modules, therefore, losing only the functionality of the failed module and allowing the operating modules to communicate with each other. This way a limited functionality is always maintained, thereby making system 200 more robust.

Each module may take the form of an embedded system, that is a system based on microcontrollers (i.e. Central Processing Units (CPU) with integrated memory or peripheral interfaces), or on ordinary microprocessors (using external chips for memory and peripheral interface circuits). In implementations of the embedded system modules, the processor(s) used are of types ranging from general purpose to specialized in certain classes of computations, or even custom designed for the application at hand. In one aspect, specialized processor chips and systems are embedded Application Specific Integrated Circuit (ASIC) chips or systems.

Both design solutions, i.e. general-purpose and ASIC microcontroller systems run embedded software, and each module may have its own system clock, communication capabilities with the bus, bus controller, etc. Such a design allows simple plug-n-play of any of system's 200 modules 220-272 and the replacement of any module with a replacement module in the event of a module failure, or with a module suitable for a specific use case or client, according to marketing related concerns and options, and service agreements, or with newer or improved versions and types of modules as they become available.

Furthermore, such a system design also allows for hot (i.e. during operation) replacement or addition of system modules without interrupting system 200 operation. This is particularly important for not interrupting system logging, diagnostics, and tracking and, therefore, not jeopardizing integrity and security.

Data storage modules 287, 288, 289 can be implemented in any known storage technology comprising, but not limited to, magnetic disks, optical disks, flash memory, or other. In an exemplary embodiment, all storage modules are of the same type, while in an alternative exemplary embodiment a combination of storage modules of different technology may be used. New technologies may be used in the storage modules as soon as these technologies become available.

Display module 230 is chosen among alphanumeric display, monochrome or full-color screen, touch screen, 3D screen or other display type. Similarly, modules 230 interaction/data input means include limited or full-key keyboards, touch screen input, gesture-based input, remote device (e.g. a portable computing or interaction device) wirelessly or via wire communicated input, or other input technology according to the selected exemplary embodiment.

Sensors on modules 220-270 comprise sensors of different types for detecting system location, environmental conditions, operating conditions, system handling, tampering with system components, etc. According to the particular exemplary embodiment, some or all sensors contain embedded microprocessors that handle sensor measurements and transmit them to data logger module 220 using interrupts or other mechanisms. By means of example some or all of the types of sensors listed in Table 1 may be used, while other sensors may be added in alternative exemplary embodiments:

TABLE 1

Example list of possible sensors in system 200.

| SENSOR CATEGORY | SENSOR TYPE |
| --- | --- |
| System Location | GPS, Galileo, Iridium, GSM, 3D, 4G, 5G, FM RDS, compass |
| Environmental Conditions | Barometer, Humidity Sensor, Thermometer |
| Operating Conditions | Current Meter, Temperature |
| System Handling | Accelerometer, Barometer |
| Tampering | Accelerometer, Barometer, Proximity sensors, Micro Switches, Current Meter, System Message Tracker |

The location of system 200 may be calculated by using signals received by module 270 from one of Global Positioning System (GPS), GLONASS, or Galileo geo-localization satellite systems, or control signals from the Iridium satellite system, or Global System for Mobile communication (GSM)/3G/4G/5G control signals, or Frequency Modulation Radio Data System (FM RDS) signals. Such received signals can be exploited by taking into account the position of their source (i.e. satellite or cell, or FM antenna for RDS), the received signal strength, control data (e.g. the transmitted signal strength, etc., satellite position, cell antenna position, FM RDS antenna position) and then apply triangulation techniques to calculate the position of the receiving modules 270 and, consequently of system 200. Additional data may be used in certain exemplary embodiments in the calculation of the system's position, like maps showing obstacles (physical or man-made) used to estimate signal attenuation from their source to the sensors of system 200 and therefore relate to the distance of system 200 from the transmitting antennae.

The system is also equipped with a compass/magnetometer device which allows the identification of the directions its antennae are facing and, therefore, the deduction of the antennae coverage angles and the related attenuations of the received signals.

Environmental conditions can be determined by detecting environmental pressure with a barometer sensor module, humidity with a humidity sensor module, and temperature with a thermometer module.

Operating conditions can be determined with a thermometer module and a current meter module to measure the current consumed by system's 200 modules, and with accelerometer to detect vibrations caused e.g. during access to the system HDDs. Error messages generated from system 200 modules are also used for determining operating conditions.

System 200 handling during physical transit can be determined by exploiting acceleration data from an accelerometer sensor, and barometric pressure from a barometric sensor. Other sensory data that are also used for the same purpose are humidity, temperature, current drain, voltage levels, geo-localization data (e.g. from GNSS, FM RDS, satellite and cellular networks, etc.).

System tampering can be determined by measurements from accelerometer and barometer sensors, current meter, and system message tracking module, optical and magnetic sensors on system 200 case, unauthorized use outside the mission scenario defining where, when and how the system is to operate, etc.

The sensor modules used in system 200 may be implemented as independent modules where each module comprises a simple type of sensor and the module takes the form of an embedded system having its own system clock and being capable of driving the system bus. Integration of more than one sensors in a single module may be used in an alternative exemplary embodiment, where the module is again an embedded system but capable of supplying more than one types of sensory data.

Battery module 260 may take the form of an Uninterruptible Power Supply (UPS), battery with integrated power management capability, smart battery or other technology suitably for driving the chosen system data bus.

Battery module 260 is responsible for supplying power to the system bus, which bus then supplies power to all the remaining system modules, and which modules are needed for data logging purposes. The battery module comprises a power management unit which can regulate the supply power and perform operations like power shut-down if instructed to do so by central controller module 250. By means of example, a power shut-down may happen if the system detects hazardous operating conditions that may harm system hardware, prohibition of operation during flight, tampering, etc. The power management unit is responsible for keeping the power consumption to bare minimum in order for the battery power to last as much as possible. For this reason, the power management unit regulates the power to each of the system modules.

In alternative embodiments battery module 260 also comprises logic to make decisions (e.g. for power shut-down) of its own based on data from the sensor modules 270 in situations where the data logger module 220 has failed.

All modules that are needed to operate during tracking operations have multilevel power states. For instance, the GSM module doesn't operate all the time, instead the GSM module goes off for e.g. 10 minutes and turns on for e.g. 20 seconds to transmit data and acquire location. Similar provisions are made for the other system modules. The data logger module shuts down parts of its PCB to conserve power while keeping all real time data logging capabilities active i.e. accelerometers constantly measure the shocks and vibrations and store them in a local memory and the microcontroller wakes up when an event has happened (e.g. GNSS data available, or accelerator event occurred) or in specific intervals to get the data. These provisions significantly improve battery power conservation and consequently increase battery time.

Communications modules 250, 255 enable communication of system 200 with external systems. Module 280 have the form of Input/Output (I/O) module and comprise wired or wireless communication for data manipulation between system 200 and the source and destination data repository systems. In addition, communications modules 250, 255 play a role in sensory data and forensic operations by transmitting logged data to external forensic analysis servers.

Communications modules 250, 255 are connected to the CAN Bus 211 to communicate with the datalogger module 220 and the other modules 230-270. They also comprise WiFi/GSM/3G/4G/5G and other wireless network adaptors for communicating with remote monitoring systems owned or managed by the data storage service provider managing system 200. These wireless networks are used to send to remote monitoring systems data from Data Logging Module 220. The wireless networks are also used as a source of sensory data, where network control information is used to calculate system's 200 position. By means of example, in places where no GNSS signal is available mobile cell control information is used to estimate system's 200 position. As a result, the same network access module for mobile cell networks can act both as a position sensor and as communications transceiver. All available data from GNSS, FMRDS and WiFi modules can be combined and processed in order to estimate position of system 200. In alternative embodiments, the WiFi/GSM/3G/4G/5G and other wireless network adaptors are located in the Sensor Modules or the Communications Modules and, therefore, are not duplicated.

Data Logging Module Roles

Data logger module 220 is the main processing element of system 210 and is used to perform operations like processing sensory data, managing data storage, enforcing security mechanisms, communicating with remote monitoring systems, etc. Data logger module 220 comprises a single embedded processor unit, while in alternative exemplary embodiments module 220 comprises a redundant set of embedded processor units for ensuring uninterrupted operation in the event of a processor failure. Firmware runs at data logger module 220.

Data logging module 220, is responsible for logging all sensory data, system operational data, system handling data, and system performance data. It has a threefold role by acting as a forensic unit, performance and diagnostics unit, and debugging unit. As a forensic unit, data logging module 220 logs data relating to the handling, use and management of the portable storage system so as to allow tracing back any problems and failures relating to mishandling by the transporter during shipping, tampering by unauthorized people, unauthorized access to the data, unplugging or plugging-in system modules, user's choices, etc. These data can be used to take appropriate actions to safeguard data security and system integrity.

As a performance and diagnostics unit, data logging module 220 logs data relating to the performance of system modules, such as current drawn by the modules, speed of operation, temperature, errors, etc. These data are used to detect problems that necessitate maintenance or emergency actions, for example replacing hardware modules, updating firmware, or to detect operating conditions that necessitate actions like shut-down during flight or if hardware module temperature rising above a safety threshold.

As a debugging tool, data logging module 220 can be used to detect errors in the software and hardware design of system 200 by logging software and hardware errors, changes in the current drawn by the system modules, etc. and help in correcting system design faults.

Data logging module 220 may be implemented using any storage technology, as for example flash disk, magnetic disk, optical disk or other, and may have the form of fixed or removable storage medium like a storage card (e.g. SD card). Data logging module 220 is instructed by cloud server 295 to send its logged data (or it spontaneously sends its logged data) to one communications module 250, 255 out of the available communications modules for transmission to cloud server 295. Alternatively, data logging module 220 may copy results to the removable storage medium (i.e. memory card 275) for a system manager to remove and copy the logged data to another system or if the software running on NFS Server 282 request them through display and keyboard module 230 USB connection, the data logger 220 will copy them to NFS Server 282.

Electronic Module Hardware Architecture

Figure 3:
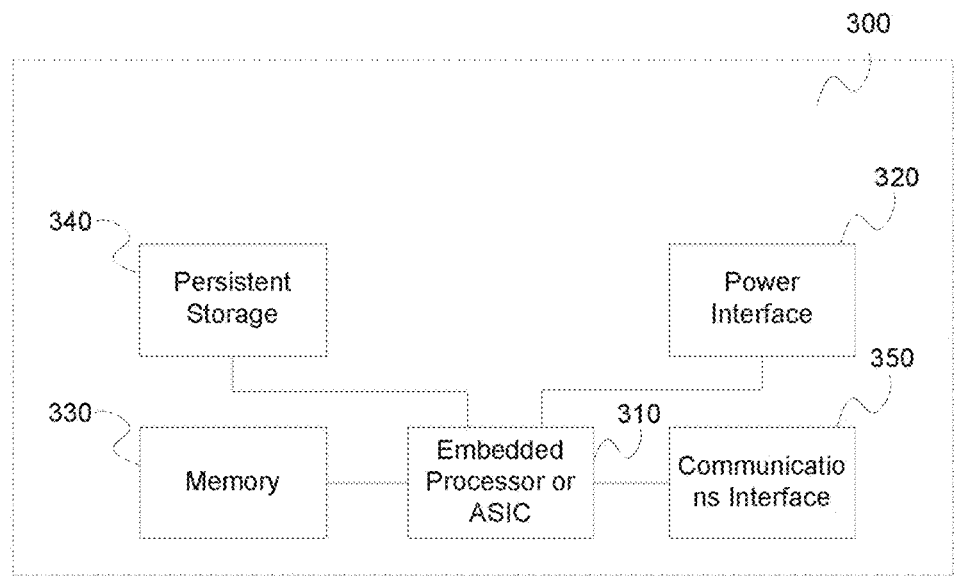
FIG. 3 shows a hardware architecture block diagram for an electronic module of the portable hugely massive storage system.

FIG. 3 shows a hardware architecture block diagram for an electronic module of the portable hugely massive storage system. Such a module comprises an embedded processor or an ASIC 310 connected to a power interface 320, memory 330, persistent storage 340, and communications interface 350.

In one aspect processor 310 is a general purpose microprocessor running embedded software, while in another aspect the processor may be an ASIC running embedded software. Processor 310 gets power from power interface 320. The power interface may contain additional power management logic to distribute power according to the needs and specifications of each electronic component of module 300.

In an alternative exemplary embodiment, the power management logic is capable of receiving commands by processor 310 or from the central controller module 250 for regulating power supply to module 300, e.g. when a shut-down is required as in an emergency situation.

Processor 310 communicates with memory 330 where software is executed and operational data is kept. Memory 330 may take the form of ROM, RAM or a combination of the two, and be implemented in any known solid state memory technology. Software code and data that need to be stored persistently after the shutdown of module 300, are stored in persistent storage 340, which may be implemented in any known persistent memory or disk technology, or removable storage technology.

Communications interface 350 may be a CAN bus controller (or other bus in alternative exemplary embodiments)

In an alternative embodiment it may also contain a satellite (e.g. Iridium) or cellular interface (e.g. GSM, 3G, 4G, 5G), or WiFi (e.g. IEEE802.11*), or any other network interface.

Software Architecture

Electronic modules 300 run embedded software to perform their tasks. Without limiting embedded software design to a specific paradigm, in one aspect, a layered architecture design is used. Other designs are used in alternative exemplary embodiments.

The layered architecture design uses software libraries and builds code from standard basic software code functionalities, enabling software code reuse for easier, faster and cheaper development, maintenance, and updating. The software code includes hardware interfaces for the hardware components 320-350 of module 300 and for the hardware components of other modules of system 200 and external systems.

The embedded software architecture allows for remote software updating either automatically, or by authorized IT engineers of system's 200 owner or data transfer service provider.

System Physical Design

Figure 4A:
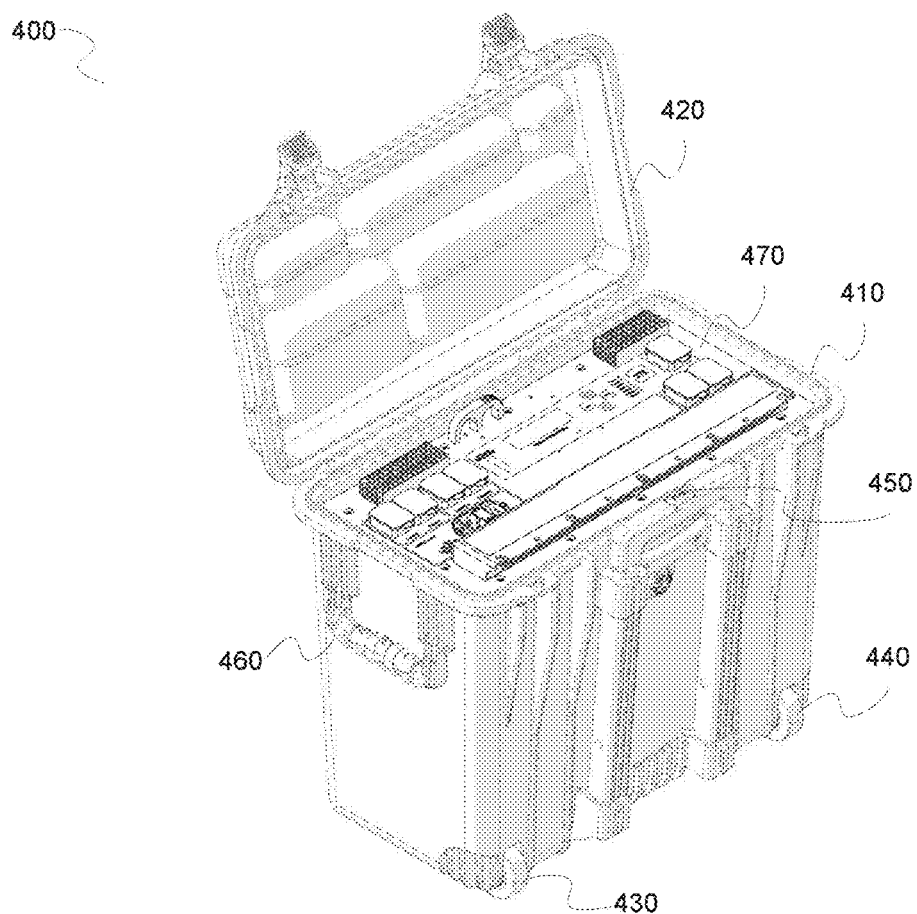
FIG. 4a is a perspective view of the physical design of the portable hugely massive storage system.

FIG. 4a is a perspective view of the physical design of the portable hugely massive storage system. Portable system 400 has the form of a rack-compatible type hardware unit 470 which is placed inside a case 410 and which case comprises a flipping-top cover 420, side handles 460, central extensible tow-handlebar 450, and towing wheels 430, 440.

Case 410 serves to protect hardware unit 470 and is constructed of metal (e.g. aluminum alloy), or polymer material (e.g. polycarbonate, or carbon fiber), or biomaterials (e.g. polymers made of fungi or seaweed) or a combination of these materials. Case 410 is shaped and sized so as to fully enclose hardware unit 470 and offer full protection against moisture, dust, and shock, it is fully insulated to protect from electricity leakage and thunder strikes, can float to protect from flooding (even with its cover open), and has a robust, tamperproof locking mechanism. The cover also comprises antennae of various types (e.g. GPS, Galileo, GSM, 3G, 4G, 5G, Iridium, WiFi, etc.) which allow hardware unit's 470 electronics to operate either with the cover open or closed, and additional electronics (e.g. temperature and humidity sensors, speakers, etc.).

Figure 4B:
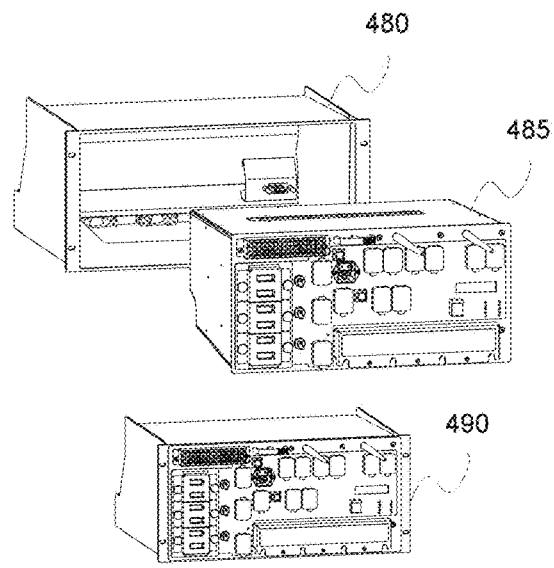
FIG. 4b illustrates an example implementation of a rack dock shelve.

Hardware unit 470 is mounted on a chassis shaped to fit in IT racks with the use of a rack dock shelve, thereby allowing hardware unit 470 to be removed from case 410 and be placed inside an IT rack if this is desired. FIG. 4b illustrates an example implementation of a rack dock shelve. Rack dock shelve 480 has similar shape and dimensions with the chassis 485 housing hardware unit 470. Chassis 485 can be inserted in shelve 480 and securely fit as shown in example 490.

Portable system 400 is designed and configured to provide the needed protection for the electronics it encloses and ease of transportation (e.g. wheels can be changed to a type suitable for the surface on which the case will be dragged, including various wheel types, skis, and other accessories). At the same time the portable system case is made of materials that limit its weight and size to the allowed weight and size for transportation as cabin baggage inside commercial flights of airlines around the world.

Portable system 400 may be placed inside rugged containers or container cases offering adequate protection for air travel inside the luggage compartment and transportation at airports using the standard loading, unloading and delivery methods and apparatuses.

Figure 5:
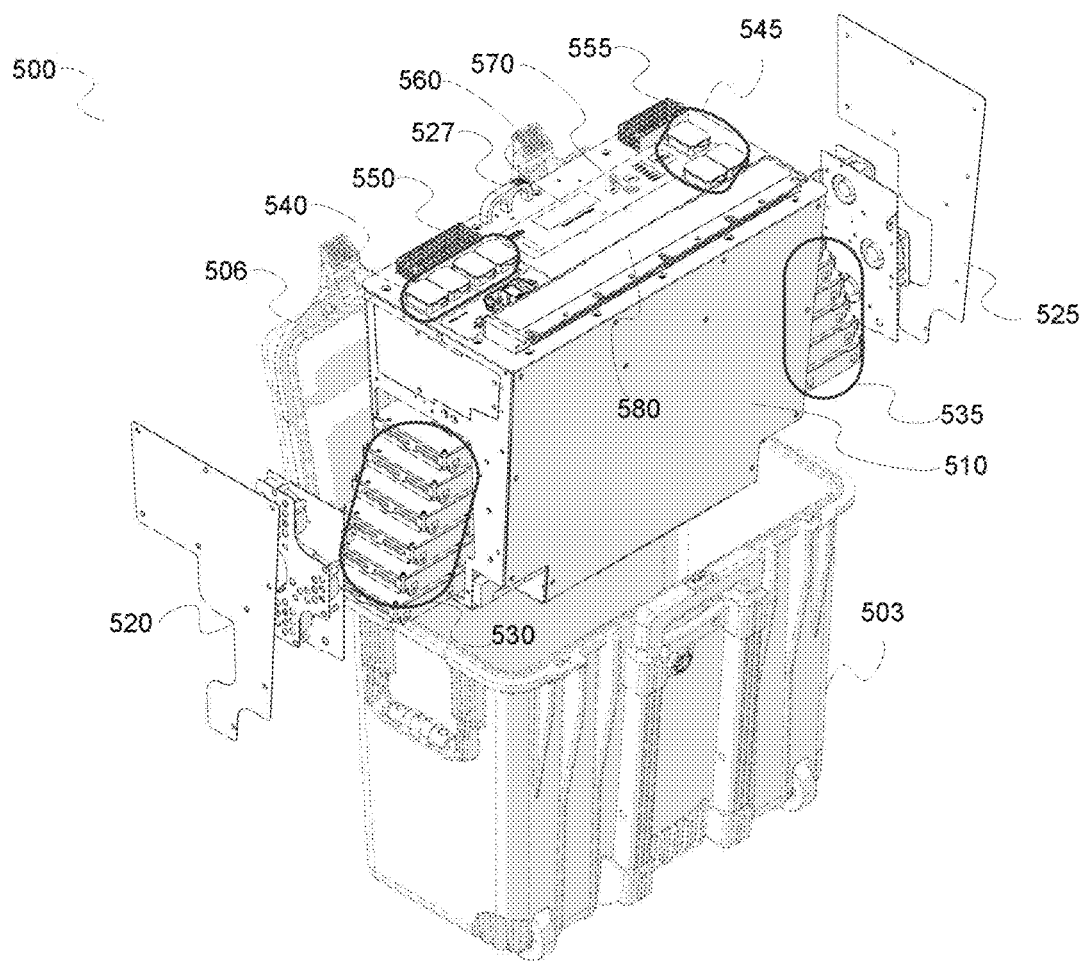
FIG. 5 is a perspective, partially blown-up view of the physical design of the portable hugely massive storage system showing the hardware unit lifted out of its case.

FIG. 5 is a perspective, partially blown-up view of the physical design of the portable hugely massive storage system showing the hardware unit lifted out of its case. Portable system 500 is shown comprising case 503 with its flip-top cover 506, and hardware unit 510. Hardware unit 470 is floating inside case 503 using shock absorbers and elastic foam material for protection against drops, vibrations, and blowing. In particular, up to three different shock absorbing mechanisms are included: (i) elastic foam to absorb shocks between case and chassis, (ii) shock absorbers disposed between chassis and all internal individual sub-chassis housing individual modules or assembly made from a combination of natural rubber for spring action and elastic polymer foam for dumping action, and (iii) shock mounts made from elastic rubber tubes and locking screws. Special provision has been put in the design of the canisters housing the storage units (HDDs etc.) so as to also allow motion of the units in the events of deformation of the canisters and movement of their back planes and associated wirings.

Other exemplary embodiments comprise interior shielding between case and chassis including at least one of (i) heat transfer insulation using insulation foam to isolate external environmental conditions and (ii) ElectroMagnetic Field (EMF) protection by way of a grounded cooper shielding layer. In yet further exemplary embodiments, hardware unit 470 is equipped with a pre-heating mechanism for operation in extremely cold environments and/or includes a compartment below the chassis and inside case 503, which compartment is configured to allow for liquid drainage, and an exit valve for drainage of the compartment.

Case 503 and cover 506 also comprise a variety of digital, analog and other types of sensors that, among other things, can detect the lid open-closed status and sound alarms, as well as, provide an electrical bus interface between onboard electronics, including between cover 506 and case 503, via hinges (not shown) that connect the lid to the main body.

Hardware unit 510 comprises multiple modules 530, 535 (shown in pull-out position for visibility purposes), covers-protectors 520, 525, Ethernet I/O ports 540, 545, air out vents 550-555, display 560, user interaction module 570 (buttons are illustrated in this exemplary embodiment), air in vent 580 for cooling hardware unit 510, and pull-up handle 527 for puling hardware unit 510 out of its case 503.

Modules 553, 535 are envisioned as modular units capable of being provisioned, managed and controlled by one or more onboard Management and control Control Subsystem (MCS) units. Modules 530, 535 may include multiple MCS units and various electronic building blocks of modular design and form factor and configured to be easily fitted and removed as needed during installation, repair, reconfiguration or the like. They correspond to the modules of system 200 in FIG. 2.

Data Logging Module Embodiments

Data logging module 220, is an innovative solution for ensuring the secure storage and handling of sensitive data, as well as, the correct handling of portable system 400. Module 220 has forensic use for tracing back actions, events, operating conditions etc. for identifying among others, mishandling, problems during operation, user actions and breech of security.

In one exemplary embodiment, data logging module 220 can be implemented as a sophisticated forensic data logger, while in an alternative embodiment as a forensic data logger with built-in forensic analyzer.

In the first embodiment, the sophisticated forensic data logger, module 220 receives and logs data from connected sensor modules 230-270. According to client's preferences and configuration of system 400, a different mix of sensor modules are connected and, therefore, a different set of sensory data are logged. For example, a GNSS module and a 3G module may be connected. GNSS positioning data are logged indicating the position of system 400, alongside 3G control data identifying signal strengths from the cell where the 3G module is wirelessly connected to and other nearby cells. The 3G data logged can be used in the event of loss of GNSS signal (e.g. inside buildings during transit or use of system 400) for triangulating received signal strengths, using transmitted signal strengths, location of cell antennae, and knowledge of terrain or other obstacles between system 440 and cell antennae that attenuate signals. These data may be logged as received from the sensor modules, ready for subsequent transmission or transferred to a remote forensic (or tracker) server for analysis and determination of the position and transit route of system 400.

In the alternative embodiment, the forensic data logger with built-in forensic analyzer receives the sensory data and processes them before logging them in its local storage. In the present example, logged data comprises system location from the GNSS module readings and location from the 3G module readings. Other data can also be logged.

Location Calculation and Tracking

Data logging module 220 logs all data from the available sensors. Following data logging module 220 analyzes and correlates data, e.g. for position detection. Data analysis and correlation is also performed at DGP 295.

Figure 6:
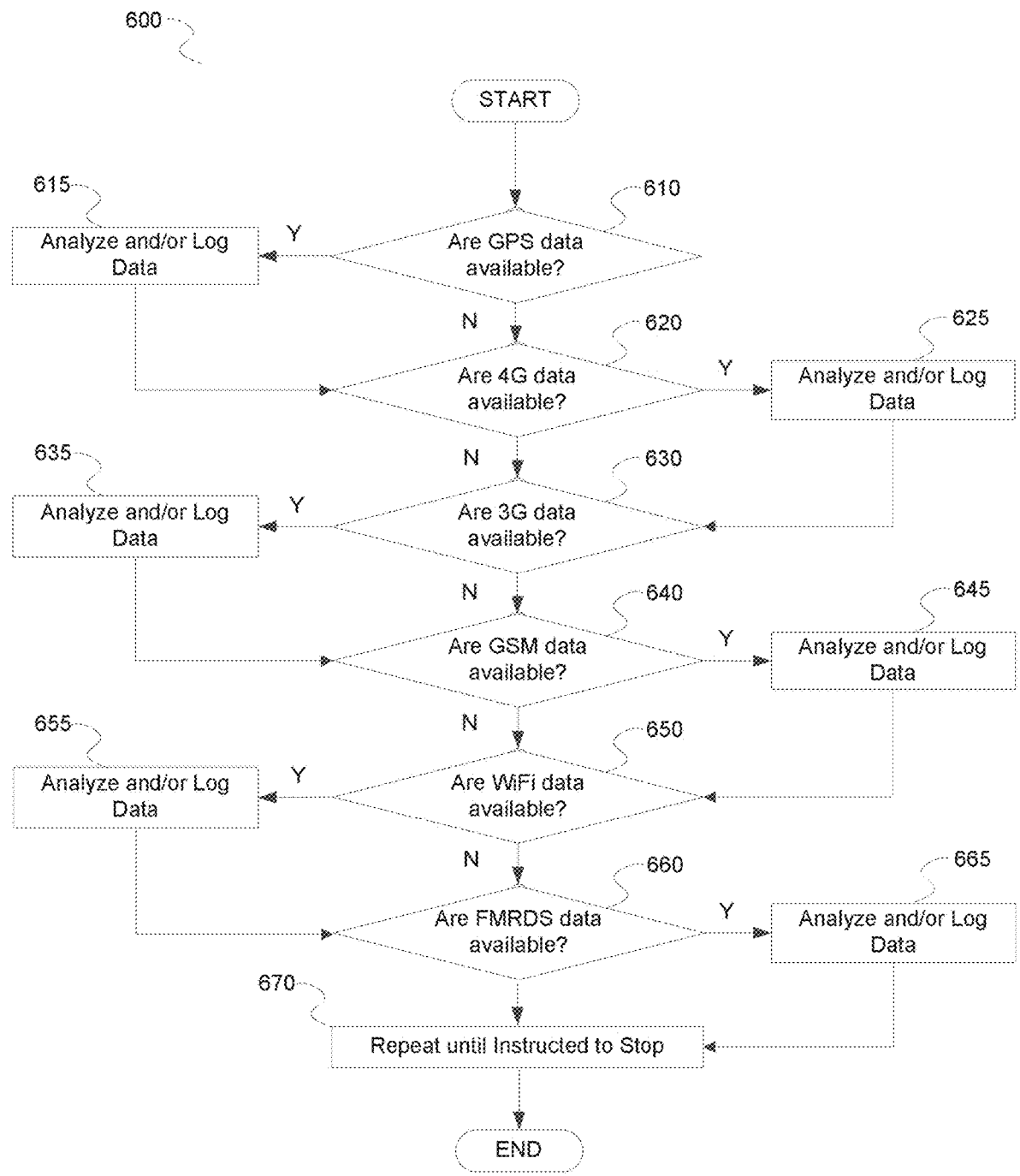
FIG. 6 shows an example flow diagram of steps used in determining system position.

FIG. 6 shows an example flow diagram of the steps used in determining system position. Data logging module 220 checks if GNSS data are available 610 (from the GNSS module) and logs them (or in the alternative embodiment it first analyzes and then logs both the raw and processed data). Depending on the GNSS module, assisted GPS for the GPS system or other versions for other GNSS systems may be used.

If no GNSS data are available or if the accuracy of the detected position is below a threshold (e.g. inside a building or at urban or natural canyons), module 220 checks if 4G data are available 620 (from the 4G module) and logs them (or in the alternative embodiment it first analyzes and then logs both the raw and processed data). 4G cellular signals typically penetrate obstacles and can be received inside buildings, if a 4G cell is available at the location of system 400.

If no 4G data are available or if the accuracy of the detected position is below a threshold, module 220 checks if 3G data are available 630 (from the 3G module) and logs them (or in the alternative embodiment it first analyzes and then logs both the raw and processed data). 3G cellular signals typically penetrate obstacles and can be received inside buildings and are more generally available compared to 4G signals.

If no 3G data are available or if the accuracy of the detected position is below a threshold, module 220 checks if GSM data are available 640 (from the GSM module) and logs them (or in the alternative embodiment it first analyzes and then logs both the raw and processed data). GSM cellular signals typically penetrate obstacles and can be received inside buildings and are more generally available compared to 3G and 4G signals.

If no GSM data are available or if the accuracy of the detected position is below a threshold, module 220 checks the surrounding WiFi signals 650 and collects the SSIDs (Service Set IDentifier) of all WiFI hot spots available along with the signal strength (from the WiFi module) and logs them (or in the alternative embodiment it first analyzes and then logs both the SSIDs and signal strength data). Inside buildings and in areas like basements or inside data rooms, cellular signals may not penetrate. In such cases WiFi signals may be present and their control signals can be used to estimate system's 400 position.

If no WiFi data are available or if the accuracy of the detected position is below a threshold, module 220 checks if FMRDS data (e.g. a public radio channel in the FM band) are available 660 (from the FMRDS module) and logs them (or in the alternative embodiment it first analyzes and then logs them). Inside buildings or basements, and in remote outdoor locations, where GNSS, cellular and WiFi signals may all or some be unavailable, FMRDS signals may be received. FMRDS signals are low frequency signals (57 kHz) sent over the main FM carrier in the frequency range of 87.5 to 108 MHz. These signals are of significantly lower frequencies than the GHz microwave frequencies of cellular networks and, therefore, can penetrate further inside buildings and behind obstacles, while at the same time can be received under roofs where GNSS signals cannot reach. A similar triangulation technique to that used for cellular signals can be used for FMRDS signals to estimate system 400 location. This can be done by searching for radio stations across the FM band and identifying RDS signals. Since FMRDS signals transmit standardized types of information such as time, station identification and program information, the FM antenna transmitting the signal can be deduced (even though not necessarily with high accuracy). Combining this information with the received signal power and the a priori known legally transmitted signal power and with a map of major obstacles between the transmission and reception locations which obstacles attenuate the FMRDS signal, the position of system 400 can be deduced. This is not as accurate as GNSS or cellular based method but can provide an estimation of location at situations and areas where no other estimation is possible. This functionality is vital for ensuring that system 400 is virtually always traceable as opposed to using only the GNSS system typically employed in tracking applications.

Other data can also be used for position calculation, like Iridium Satellite control data and other that are not shown in FIG. 6. In order to avoid erroneous location determination of the portable storage system, location information from more than one location method is always used. In addition to exploiting available location data from more than one sources for increasing location accuracy, cloud server 295 monitors and compares the locations calculated from each method and detects off-range location results which may be caused by erroneous sensor readings due to interference or malicious act to intentionally fool the system. As a result, the location of the portable storage system is tracked with increased accuracy and confidence as opposed to single method readings.

All location readings are stored in a Location Data Correlation Pool for processing by the cloud server. In this pool all data and information from the GNSS, the WiFi SSIDs with the associated signal strengths, the FMRDS station IDs with respective signal strengths, the GSM cell towers IDs with respective signal strength and the compass with gyroscope information are stored. These data are correlated to verify the location of the portable storage system from more than one location data sources in order to be absolutely sure of the whereabouts of the system and avoid misleading measurements from unintentional or intentional electromagnetic interference. The pool is also used to extract the approximate location of the portable storage system when a GNSS signal or a GSM signal is not available.

Similarly, logging and optionally analysis of other sensory data are done. By way of example, the following sensors are used:

a 3-axis gyroscope to measure if the system case has been dropped and rotated upside down.

a magnetometer/compass to correlate this information with the various measurements from the various antennas the device uses to measure signal strength. I.e. if the magnetometer/compass measures the signal strength of an FM station, by knowing where the FM antenna was pointing that particular moment of the measurement, the DGP will be able to more accurately calculate the triangulation of location since it will be possible to also consider the gain pattern of the antenna in relation with its position on the case.

an accelerometer to measure the maximum shock that the system has suffered during transport and therefore determine mishandling a humidity sensor to measure the exposure in humidity of the system a barometer to measure the environment atmospheric pressure, to calculate the approximate altitude of the device and thus deduce flight (for instance this is useful to shut off system modules, especially communication modules, to preserve battery power during flight). The barometer is also used to sense the opening of the portable storage system case from the sudden pressure change that is introduced when the airtight case closes in one atmospheric pressure environment and then opens on a different atmospheric pressure environment during transportation. The barometer sensor is also used to sense drilling events of the system case, which events indicate potential tampering with the internal hardware and stored data current meter to sense current drain and fluctuations in voltage supplied to the system's modules. These readings may be used to detect hardware problems, debug hardware and software and track operation of system modules like hard disks of storage modules 284 a compass/magnetometer to estimate the direction the system antennae are facing for deducing antennae fans and estimating attenuation characteristics of the received signals used in position estimation Other data logged include, for example, plugging-in and out hardware modules, user interaction, system actions (e.g. shut down, data storage, etc.), system hardware and software errors, etc.

In one aspect, data logging module 220 logs data from a sensor (e.g. magnetic or optical) detecting opening and closing of the cover of the case containing system 400.

In an alternative exemplary embodiment, analysis of logged data is performed by an Artificial Intelligence unit that is added to the data logger module 200.

The above data can be analyzed to (a) trace shipping and handling of the portable storage system, (b) user interaction with the system, (c) system performance and actions, (d) system debugging.

In one aspect, system tracing and handling is used to estimate if shipping and handling of the hardware is done as intended and described in a service contract or with negligence that can lead to damage of the case and/or the electronics and which could jeopardize security and integrity of the data itself and the data transfer service. For this reason, it is important to analyze the route followed during shipping the portable storage system to identify transit through hazardous or dangerous areas, rapid accelerations indicating dropping the case or incurring sudden blows, exposing the case or the exposed hardware to excess heat or humidity, etc. and combine these data with knowledge about the person responsible for transiting the system, ultimately allowing to attribute accountability for damages, retrain personnel, and take additional protection measures, including system and case redesign.

In another aspect, user interaction with system 400 is used to identify unintended actions by service personnel of the system owner, client personnel, courier personnel, or other unauthorized personnel. One example being the opening of top 420 of case 410, which houses and protects the electronic modules 470 of system 400. This is detected by logging and analyzing sudden changes in barometric pressure inside the airtight case as detected by the barometric pressure module (this is differentiated from gradual changes in barometric pressure, which may indicate flight). Alternatively, if case 410 is equipped with a sensor to detect opening or closing of top 420, these data may also be used. Combination of the two approaches for detecting opening of the case can provide more accurate results in case of sensor malfunction or electromagnetic interference.

In another aspect, current draw measurement above a limit on storage modules and or motherboard of the NFS server can be used to indicate unauthorized user access to stored data if this information is combined with location data based on a mission scenario.

In one aspect, user interaction with the system is detected by logging and analyzing user interaction via the user interaction/data input module 230, or via an external interaction device (e.g. smartphone, laptop, computer, UI device) connecting to the system via one of the communications modules 280. User interaction may include, stored data manipulation, logged data access, system parameter manipulation, system mode of operation manipulation (e.g. shutdown, storage module deactivation), etc.

In one aspect system, performance and action logging and analysis are done to evaluate system performance and get insights on potential problems during operation and to find remedies. For example, the use of certain sensory modules in certain service agreements may not be optimum and may need to be revised. For instance, use of 4G modules in developing countries may not be optimum as 4G network deployment in such countries or remote locations may be very low, or the use of Iridium modules may be necessary in scarcely populated areas, or additional cooling modules may be needed for use in equatorial countries, or additional shock absorbing materials may be needed in areas where poor roads exist. In addition, system actions like spontaneously powering off system modules needs to be analyzed to find malfunctions.

In another aspect, system debugging may be done by analyzing system operational data. For instance, changes in current drawn by hardware modules and faults produced by hardware or software may be analyzed to identify bugs in software and hardware design that need to be corrected for not jeopardizing security, integrity of performance. Changes in drawn current can be differentiated from hardware module failure or unplugged modules by checking if the module is producing data (or control data).

Operation of data logging module 220 may be controlled by cloud server 295, or in another aspect of the present innovative solution, data logging module 220 may operate autonomously by becoming a master module and gaining control of the system bus and direct access to other modules. This autonomous operation may prove useful in the event of failure of cloud server 295, or failure of communication with cloud server 295 or in failure and other module of the portable system. Similarly, other modules may operate autonomously without waiting for commands or data from other modules (including commands from data logger module 220).

In one aspect, data logging module 220 may also be configured with enough processing power to perform forensic analysis of the logged data. In such a scenario, data logging module 220 may contain embedded software code to combine readings from some or all the available sensors. For example, GNSS location readings may be refined by readings derived from analyzing cellular control signals, FMRDS signals, etc. Similarly, opening cover 420 of case 410 may be detected by magnetic sensor readings which may also be combined with barometric readings to ensure the correct detection of an opening/closing event and avoid errors due to signal glitches, interference, etc.

In another aspect, an opening/closing event may be used to detect unauthorized access and tampering of system 400, by combining the magnetic, optical and barometric readings with user logging into the system, data from the data room secure access logger where the system is located, which data identifies the persons entering the room by means of RF-id and also conveys information on the persons' security clearing level and the operations they are allowed to perform, and data from courier clients transporting the portable storage system between it source and destination locations.

The type and amount of sensor and forensic data that can be combined is open to the particular system exemplary embodiment and depends on the service agreement that accompanies the data transfer operation.

Emergency Actions

Analysis of the logged data may be done, according to the exemplary embodiment by cloud server 295 or by data logger module 220 in order to take immediate actions when communication between the data logging module and the cloud server is not possible due to network or server problems.

Figure 7:
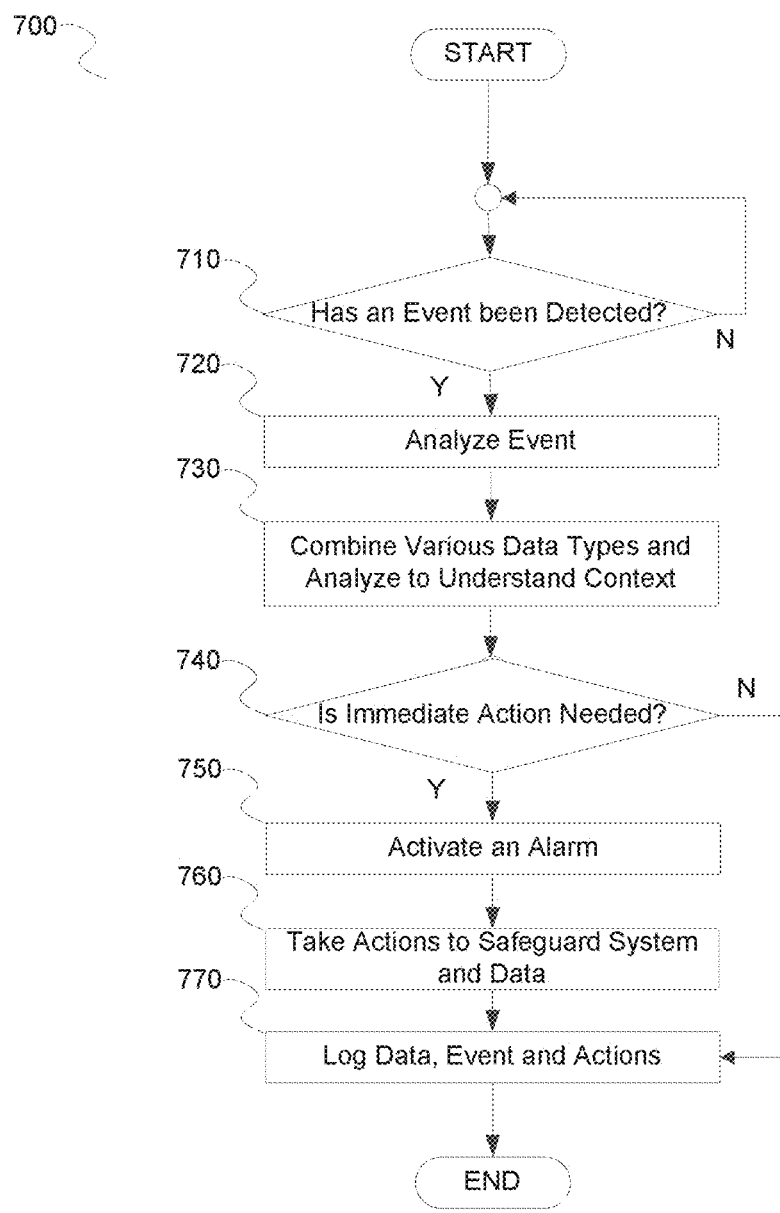
FIG. 7 shows a flow diagram of steps used in analyzing events and taking actions based on these events.

FIG. 7 shows a flow diagram of steps used in analyzing events and taking actions based on these events. The system (i.e. data logger 220 and/or cloud server 295) continuously monitors events 710. If an event is detected (e.g. from a sensor), the data logger 220 and/or cloud server 295 analyzes the event 720, and proceeds by combining available sensory data and system operating data, and analyzes them all together for understanding the context in which the detected event was generated. An example event is the sudden drop in barometric pressure inside case 410. By itself it could mean (a) opening cover 420 by authorized personnel, (b) tampering of the system by unauthorized personnel, or (c) damage to the case as a result of dropping the case for example. In (a) combining an opening event with data related to logging into the system can create knowledge that it was done by an authorized engineer. In (b) failure of detecting an authorized person logging into the system, this may indicate that an unauthorized person has tampered with the system. In (c) damage to the case can be deduced by combining data from the accelerator module, when a sudden acceleration may indicate a drop resulting in breaking the airtight seal of the case. Other combination of events can be used to deduce context and be used to take appropriate actions.

Based on the deduced context, the need of immediate action is assessed 740. By means of example, detection of tampering with the system or unauthorized access to data and system modules can be used to trigger silent or audio-visual alarms 750 for drawing the attention of authorized on-site personnel or of personnel at a management center, such as at the premises of the owner of system 400 or the data transfer service provider.

An immediate action is then taken 760 to safeguard system integrity and/or data security. Example actions may be shutting the system down or shutting down certain system modules to prevent hardware damage, such as in cases where vibrations, overheating, moisture, or tampering is detected. Other example actions may be data wipe-off or TPM module destruction when an unauthorized log-in is detected or even when an authorized person logs-in at unauthorized times like system transit, so as to prevent third parties from stealing the credentials of the authorized person and trying to get access to the stored data or to deactivate the forensics or communications modules. Other examples of immediate actions are alerting the police and providing information to track the hijacked or stolen system. For this reason, interfaces are built into system 400, which enable exchange of data and control messages with standardized or proprietary security, supervision and policing systems. In an exemplary embodiment, a Very High Frequency (VHF) beacon is included in the portable storage system which transmits a VHF signal that can be used to locate the beacon using a VHF receiver with a directional antenna. This beacon is similar to the beacons used in an airplane black box.

In another aspect, the system may wipe-off data by setting all storage bit locations to "1" or "0" or by overwriting stored data with garbage data so as to make data recovery of a stolen device impossible. This operation may need significant time to complete, so in cases of emergency the system has a "destruct" function which may supply high voltage signals (much higher than the designed write signals) to the storage modules, effectively burning the electronic storage locations and making it impossible to recover data from the stolen system. In alternative, and preferred exemplary embodiments, instead of electrically "burning" the storage modules, only the crypto-processor in the TPM module holding the encryption keys for the storage modules is electrically destroyed.

Such actions are described in the embedded code run by the central controller module 250, the data logging module 220, or other system modules.

Regardless of the actions taken, all data, events and actions are logged by the data logging module 220, even if no events are detected, where in this case operational and sensory data are logged for possible future forensic use.

Storage of data in the data logging module 220 is done at internal storage in the module, where storage is physically implemented by means of any storage technology, comprising magnetic and optical disks, solid state technology or other. Data logging module 220 may also comprise slots for detachable storage devices (e.g. a memory card or a flash disk) which can hold copies of the logged data and which may be used to facilitate log transfer to other devices or analysis servers.

In one aspect, data logs are transmitted to forensic analysis servers, typically at the premises of the owner of the portable storage system or the provider of the data transfer service. Data logging module 220 may be programmed to automatically transmit logged (raw and/or analyzed) data at predetermined time intervals, e.g. every few seconds or minute. The entire log can also be transmitted at once in the event of a security event or be transferred using a detachable memory storage device.

In one aspect, the transmission of logs is done under the control of cloud server 295, while in another aspect under the control of data logger module 220.

In a first aspect, the analysis of the logged data is performed by cloud server 295, in a second aspect analysis is performed by data logging module 220, while in a third aspect analysis is performed by a forensic analysis server other than cloud server 295.

Logged data and/or analyzed data are stored in log files. Log files may comprise ASCII files, XML files, or other file formats. In another aspect, data may be stored in databases, such as SQL, noSQL or other.

Data logs and analyzed data, which may be sensory data, system operational data, system handling data, system performance data, or other data, have a threefold role by acting as a forensic unit, performance and diagnostics unit, and debugging unit. According to the context of the logged data and the underlying system events, real life events are deduced (e.g. security breech) and actions are taken which may be immediate (as described above), or at a later time, as in debugging, software updating, system reconfiguration, etc.

Commercial Uses of the Portable Hugely Massive Data Storage System

The portable hugely massive data storage system can be applied in numerous commercial scenarios. By means of example and by no means limiting the scope and context of use of the proposed innovative solution, the following uses are identified:

one-off huge data transfers periodic huge data transfers remote location (e.g. oil rig) huge data transfers ordinary location (e.g. hospital) huge data transfers natural emergency (e.g. earthquakes) huge data transfer and system setup corporate emergency (e.g. data center fire) huge data transfer and system setup setting up a business for providing huge data transfer and system setup services while owing the portable hugely massive data storage system setting up a business for providing huge data transfer and system setup services while leasing the portable hugely massive data storage system renting the portable hugely massive data storage system to a client to perform local data collection and processing from Internet Of Things devices or other sensors, store locally the raw data and send a digested version of the collected information to a cloud server renting the portable hugely massive data storage system to a client to perform a huge data transfer and system setup selling the system as white label system to a client to provide huge data transfer and system setup services leasing the system as while label system to a client to provide huge data transfer and system setup services selling the system as white label system to a client to perform local data collection and processing from Internet Of Things devices or other sensors, store locally the raw data and send a digested version of the collected information to a cloud server leasing the system as while label system to a client to perform local data collection and processing from Internet Of Things devices or other sensors, store locally the raw data and send a digested version of the collected information to a cloud server The above exemplary embodiment descriptions are simplified and do not include hardware and software elements that are used in the embodiments but are not part of the current innovative solution, are not needed for the understanding of the embodiments, or are obvious to any user of ordinary skill in related art. Furthermore, variations of the described technique, system architecture, and software architecture are possible, where, for instance, technique steps, and hardware and software elements may be rearranged, omitted, or new added.

Various embodiments of the invention are described above in the Detailed Description. While these descriptions directly describe the above embodiments, it is understood that those skilled in the art may conceive modifications and/or variations (such as addition, deletion, or reordering of process steps, and software and hardware modules) to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

Those of skill in the art would understand that signals may be represented using any of a variety of different techniques. For example, data, software, instructions, signals that may be referenced throughout the above description may be represented by voltages, currents, electromagnetic waves, magnetic fields or particles, light or any combination thereof.

Those of skill would further appreciate that the various illustrative radio frequency or analog circuit blocks described in connection with the disclosure herein may be implemented in a variety of different circuit topologies, on one or more integrated circuits, separate from or in combination with logic circuits and systems while performing the same functions described in the present disclosure.

Those of skill would also further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A data logging module configured for placement inside a portable server storage system storing data and for securing the physical transport of the portable server storage system between at least two different locations, the data logging module comprising:
 a multi-master data bus;
 a plurality of sensors configured to provide over the multi-master data bus:
  first readings from at least one of a barometer and proximity sensor used to sense opening or closing of an airtight case and use of the portable server storage system, second readings from at least one of an accelerometer, barometer and current meter sensor and system events and user interactions used to sense at least one of poor handling of or tampering with the portable server storage system, software and hardware errors, and system performance, and third readings from at least one of a thermometer, hygrometer and current meter sensor and system events used to sense hazardous operating and environmental conditions; and a microcontroller configured to:

analyze sensory data and system operational parameters, system events, and software and hardware errors, derive a context in which the analyzed sensory data and system operational parameters, system events, and software and hardware errors were generated, and deduce real life events from the context and instruct the portable server storage system to take at least one action; and a transmitter configured to transmit data from the plurality of sensors, the system operational parameters, the system events, and the software and hardware errors to a server for real time tracking and for forensic, diagnostic, performance, and debugging operations.

2. The data logging module of claim 1, wherein the microcontroller has a mathematics coprocessor; and further comprising a plurality of persistent, volatile and removable memory units.

3. The data logging module of claim 1, wherein the multi-master data bus comprises a first multi-master data bus, and wherein the data logging module communicates in encrypted form over:

the first multi-master data bus with at least one of the plurality of sensors, a display and user interaction module, at least one cooling fan control module, at least one of a plurality of wireless transceiver modules, a battery and charger module, a power distribution module, and a file server system and encryption module; and a second multi-master data bus with a crypto-processor module, where the crypto-processor module is also connected to the file server system and encryption module over the first multi-master data bus.

4. The data logging module of claim 3, wherein modules with which the data logging module communicates comprises at least one of a microcontroller, a low power microcontroller, a battery, a memory, and an interface to the first or second multi-master data bus.

5. The data logging module of claim 3, wherein the data logging module and modules with which the data logging module communicates comprise embedded systems or embedded Application Specific Integrated Circuits, or a combination thereof, and where the data logging module and the modules with which the data logging module communicates are configured as pluggable modules on a chassis suitable for use in a computing rack or for transit inside the airtight case of the portable server storage system, wherein the airtight case comprises at least one type of shock protection device and is configured to be carried as cabin luggage in commercial flights.

6. The data logging module of claim 5, further comprising:

an engine to preserve power, where the engine performs at least one of the following:

putting the data logging module and at least one of the modules that the data logger communicates with into a sleep mode and periodically waking up the data logging module and the at least one of the modules that the data logging module communicates with;

putting the data logging module and at least one of the plurality of sensors that the data logging module communicates with into a sleep mode, allowing at least one of the plurality of sensors comprising a low-power microcontroller to stay in an awake mode and save data at a local memory on the at least one of the plurality of sensors, and having the at least one of the plurality of sensors issues an interrupt signal to wake up the data logging module when the local memory at the at least one of the plurality of sensors becomes full or when a sensor reading exceeds or falls below a threshold value; and putting the data logging module and at least one of the plurality of wireless transceiver modules that the data logging module communicates with into a sleep mode, allowing at least one of the plurality of wireless transceiver modules comprising a low-power microcontroller to stay in an awake mode and save data at a local memory on the at least one of the plurality of wireless transceiver modules, and having the at least one of the plurality of wireless transceiver modules issues an interrupt signal to wake up the data logging module when the local memory at the at least one of the plurality of wireless transceiver modules becomes full or when a transceiver reading exceeds or falls below a threshold value.

7. The data logging module of claim 3, wherein the data logging module receives and stores, in encrypted form, raw or processed data derived from the raw data, and where data are processed by at least one of the plurality of sensors, the data logging module, a cloud server, or a remote analysis server, or a combination thereof.

8. The data logging module of claim 7, wherein at least one of the data logging modules, the cloud server, and the remote analysis server analyzes data from the plurality of sensors and from the plurality of wireless transceiver modules for at least one of:

improving position tracking accuracy of the portable server storage system;

position tracking in the absence of data from at least one of the plurality of sensors and the plurality of wireless transceiver modules;

verifying position tracking measurements in the presence of interference and jamming;

detecting opening or closing of the airtight case of the portable server storage system;

detecting system use during flight;

detecting poor handling of or tampering with the portable server storage system;

detecting software and hardware errors;

evaluating system performance;

detecting hazardous operating and environmental conditions; and deriving the context in which the data, parameters, system events and errors were created.

9. The data logging module of claim 8, where wherein the position of the portable server storage system is calculated by triangulating data from at least one of the plurality of sensors or the plurality of wireless transceiver modules, and where the triangulation uses information on at least one of the transmitted signal strengths, the position of the transmitting antennae and obstacles in the paths between the transmitter and receiver antennae of the signals.

10. The data logging module of claim 8, where wherein the plurality of sensors comprise GPS, GLONASS, Galileo, hygrometer, barometer, magnetic sensor, optical sensor, current meter, and accelerometer, and the plurality of wireless transceiver modules comprise Iridium, GSM, Galileo, Iridium, FM RDS, VHF, EDGE, 3G, 4G, 5G, WiFi, DAB, DVB-T, VHF, WiMax, ZigBee, and APRS transceivers.

11. The data logging module of claim 1, wherein the at least one action comprises at least one of:
    powering off at least one system module, except the data logging module;
    wiping-off data from at least one data storage module;
    permanently incapacitating the at least one data storage module by supplying a voltage signal in excess of the rating of a writing voltage signal;
    permanently incapacitating the crypto-processor of the crypto-processor module by first instructing the crypto-processor module to electrically isolate itself from a file server system and encryption module by configuring at least one diode device into a non-conducting state, and by second supplying a voltage signal in excess of the rating of a writing voltage signal;
    triggering a silent alarm;
    triggering an audiovisual alarm;
    transmitting data logs to a cloud server; and
    transmitting data logs to a forensic server.

12. The data logging module of claim 1, wherein the data logging module operates in accordance with a mission description, where the mission description comprises at least one of:
    at least one waypoint through which waypoint the portable server storage system must pass;
    an area around each of the at least one defined waypoint and an association of one area with one waypoint, where each area is used to geo-fence the operation of the portable server storage system by allowing the portable server storage system to at least one of (a) operate and (b) execute a task only inside the area around the associated waypoint;
    a time slot for each defined area and an association of one time slot with one area, where each time slot allows the portable server storage system to operate only inside the time slot at the associated area;
    at least one condition of operation of the portable server storage system and an association of the at least one condition of operation with the area associated with a waypoint, such condition of operation comprising date, and detection by the data logging module of certain ranges and sequence of occurrence of sensor measurements, where each condition of operation allows the portable server storage system to operate only if the condition of operation is met and the portable server storage system is located at the associated area at the associated time slot; and
    at least one password associated with each defined area and time slot, where each password allows the portable server storage system to operate only if the correct password is entered at the associated area and time slot.

13. The data logging module of claim 12, where the mission description is created at a computing device or apparatus, or at a server external to the data logging module using a graphical user interface and the mission description is transmitted to the data logging module.

14. The data logging module of claim 12, wherein the microcontroller is further configured to compare and match data from at least one of the plurality of sensors and transceiver modules of the portable server storage system, and data from external systems with the mission description for detecting deviations from the mission description during transit of the portable server storage system and (b) upon detection of deviations from the mission description during transit of the portable server storage system, the data logging module performing at least one of:
    powering off at least one system module, except the data logging module;
    wiping-off data from at least one data storage module;
    permanently incapacitating the at least one data storage module by supplying a voltage signal in excess of the rating of a writing voltage signal;
    permanently incapacitating the crypto-processor of a crypto-processor module by first instructing the crypto-processor module to electrically isolate itself from a file server system and encryption module by configuring at least one diode device into a non-conducting state, and by second supplying a voltage signal in excess of the rating of a writing voltage signal;
    triggering a silent alarm;
    triggering an audiovisual alarm;
    transmitting data logs to a cloud server; and
    transmitting data logs to a forensic server.

15. The data logging module of claim 1, wherein the data logging module is configured for logical separation from the portable server storage system so that it is unable to access data stored in the portable storage server system.

16. A method in a data logging module configured for placement inside a portable server storage system storing data and for securing the physical transport of the portable server storage system between at least two different locations, the method comprising:
    providing from a plurality of sensors:
        first readings from at least one of a barometer and proximity sensor used to sense opening or closing of an airtight case and use of the portable server storage system,
        second readings from at least one of an accelerometer, barometer and current meter sensor and system events and user interactions used to sense at least one of poor handling of or tampering with the portable server storage system, software and hardware errors, and system performance, and
        third readings from at least one of a thermometer, hygrometer and current meter sensor and system events used to sense hazardous operating and environmental conditions;
    receiving at the data logging module at least one of data from at least one of the plurality of sensors, data from at least one transceiver module, system operational parameters, events, system software and hardware errors, and data from external systems;
    analyzing the at least one of data from the at least one of the plurality of sensors, data from the at least one transceiver module, system operational parameters, events, and system software and hardware errors, where the analysis is performed at the data logging module, or at a cloud server, or at a forensic server, and where the analysis derives the context in which the data, parameters, events and errors were created;
    comparing the analyzed data, parameters, events and errors and the context with a mission description, where the comparison is performed at the data logging module, or at the cloud server, or at the forensic server;
    using the results of the comparison to detect deviations from the mission description; and taking at least one action in response to deviations from the mission description.

17. The method of claim 16, wherein the at least one action comprises at least one of:
- powering off at least one system module, except the data logging module;
- wiping-off data from at least one data storage module;
- permanently incapacitating the at least one data storage module by supplying a voltage signal in excess of the rating of a writing voltage signal;
- permanently incapacitating the crypto-processor of a crypto-processor module by first instructing the crypto-processor module to electrically isolate itself from a file server system and encryption module by configuring at least one diode device into a non-conducting state, and by second supplying a voltage signal in excess of the rating of a writing voltage signal;
- triggering a silent alarm;
- triggering an audiovisual alarm;
- transmitting data logs to the cloud server; and
- transmitting data logs to the forensic server.

18. The method of claim 16, wherein the data logging module is configured for logical separation from the portable server storage system so that it is unable to access data stored in the portable storage server system.

19. A non-transitory computer program product that causes a data logging module configured for placement inside a portable server storage system storing data and for securing the physical transport of the portable server storage system between at least two different locations, the non-transitory computer program product having instructions to:
- provide from a plurality of sensors:
  - first readings from at least one of a barometer and proximity sensor used to sense opening or closing of an airtight case and use of the portable server storage system,
  - second readings from at least one of an accelerometer, barometer and current meter sensor and system events and user interactions used to sense at least one of poor handling of or tampering with the portable server storage system, software and hardware errors, and system performance, and
  - third readings from at least one of a thermometer, hygrometer and current meter sensor and system events used to sense hazardous operating and environmental conditions;
- receive at the data logging module at least one of data from at least one of the plurality of sensors, data from at least one transceiver module, system operational parameters, events, system software and hardware errors, and data from external systems;
- analyze the at least one of data from the at least one of the plurality of sensors, data from the at least one transceiver module, system operational parameters, events, and system software and hardware errors, where the analysis is performed at the data logging module, or at a cloud server, or at a forensic server, and where the analysis derives the context in which the data, parameters, events and errors were created;
- compare the analyzed data, parameters, events and errors and the context with a mission description, where the comparison is performed at the data logging module, or at the cloud server, or at the forensic server;
- use the results of the comparison to detect deviations from the mission description; and
- take at least one action in response to deviations from the mission description.

20. The non-transitory computer program product of claim 19, wherein the at least one action comprises at least one of:
- powering off at least one system module, except the data logging module;
- wiping-off data from at least one data storage module;
- permanently incapacitating the at least one data storage module by supplying a voltage signal in excess of the rating of a writing voltage signal;
- permanently incapacitating the crypto-processor of a crypto-processor module by first instructing the crypto-processor module to electrically isolate itself from a file server system and encryption module by configuring at least one diode device into a non-conducting state, and by second supplying a voltage signal in excess of the rating of a writing voltage signal;
- triggering a silent alarm;
- triggering an audiovisual alarm;
- transmitting data logs to the cloud server; and
- transmitting data logs to the forensic server.

* * * * *